(12) United States Patent
Thompson et al.

(10) Patent No.: US 12,386,802 B2
(45) Date of Patent: *Aug. 12, 2025

(54) COLUMN LINEAGE FOR RESOURCE DEPENDENCY SYSTEM AND GRAPHICAL USER INTERFACE

(71) Applicant: Palantir Technologies Inc., Denver, CO (US)

(72) Inventors: James Thompson, London (GB); Joseph Rafidi, Washington, DC (US); Patrick Szmucer, London (GB)

(73) Assignee: Palantir Technologies Inc., Denver, CO (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/225,883

(22) Filed: Apr. 8, 2021

(65) Prior Publication Data

US 2021/0334254 A1 Oct. 28, 2021

Related U.S. Application Data

(63) Continuation of application No. 16/681,211, filed on Nov. 12, 2019, now Pat. No. 11,003,645.
(Continued)

(51) Int. Cl.
*G06F 16/22* (2019.01)
*G06F 16/16* (2019.01)
(Continued)

(52) U.S. Cl.
CPC .......... *G06F 16/221* (2019.01); *G06F 16/168* (2019.01); *G06F 16/9024* (2019.01);
(Continued)

(58) Field of Classification Search
CPC .... G06F 16/221; G06F 16/906; G06F 16/909; G06F 16/168; G06F 16/9024
See application file for complete search history.

(56) References Cited

U.S. PATENT DOCUMENTS

| 5,450,535 | A | 9/1995 | North |
| 8,624,898 | B1 | 1/2014 | Bugaj et al. |

(Continued)

FOREIGN PATENT DOCUMENTS

| EP | 2447861 | 5/2012 |
| EP | 2743814 | 6/2014 |

(Continued)

OTHER PUBLICATIONS

U.S. Appl. No. 17/315,750, Resource Dependency System and Graphical User Interface, filed May 10, 2021.
(Continued)

*Primary Examiner* — Jensen Hu
(74) *Attorney, Agent, or Firm* — Knobbe, Martens, Olson & Bear, LLP

(57) ABSTRACT

A resource dependency system may track data dependencies and data transformations for individual columns of the data sets over the span of the data pipeline (referred to as a provenance or lineage of a column). Column provenance/lineage can be logged using metadata or graph-like data structures, which the resource dependency system can generate, store, manage, and access. Column provenance/lineage can be used to generate user interfaces displaying visual node graphs with columns as nodes and the data dependencies and data transformations associated with the columns as edges between the nodes.

19 Claims, 16 Drawing Sheets

Related U.S. Application Data

(60) Provisional application No. 62/910,940, filed on Oct. 4, 2019.

(51) Int. Cl.
  *G06F 16/901* (2019.01)
  *G06F 16/904* (2019.01)
  *G06F 16/906* (2019.01)
  *G06F 16/909* (2019.01)
  *G06N 7/01* (2023.01)
  *G06Q 10/0631* (2023.01)

(52) U.S. Cl.
  CPC .......... *G06F 16/904* (2019.01); *G06F 16/906* (2019.01); *G06F 16/909* (2019.01); *G06N 7/01* (2023.01); *G06Q 10/06315* (2013.01)

(56) References Cited

U.S. PATENT DOCUMENTS

| | | | |
|---|---|---|---|
| 9,229,952 | B1 | 1/2016 | Meacham et al. |
| 9,836,183 | B1 | 12/2017 | Love et al. |
| 9,881,066 | B1 | 1/2018 | Yousaf et al. |
| 10,007,674 | B2 | 6/2018 | Fink et al. |
| 10,432,639 | B1 | 10/2019 | Bebee et al. |
| 10,592,068 | B1 | 3/2020 | Sedky et al. |
| 11,003,645 | B1 | 5/2021 | Thompson et al. |
| 11,030,248 | B2 | 6/2021 | Borochoff et al. |
| 11,509,658 | B1 | 11/2022 | Kulkarni |
| 11,562,025 | B2 | 1/2023 | Borochoff et al. |
| 11,775,898 | B1 | 10/2023 | Thompson et al. |
| 12,248,515 | B2 | 3/2025 | Borochoff et al. |
| 2003/0105771 | A1 | 6/2003 | Tiefenbrun et al. |
| 2005/0055369 | A1 | 3/2005 | Gorelik et al. |
| 2006/0106847 | A1 | 5/2006 | Eckardt, III et al. |
| 2006/0107196 | A1* | 5/2006 | Thanu .................... G06F 40/18 715/217 |
| 2006/0242122 | A1 | 10/2006 | Devorchik et al. |
| 2008/0092112 | A1 | 4/2008 | Jin et al. |
| 2008/0104665 | A1 | 5/2008 | Naldurg et al. |
| 2009/0007127 | A1 | 1/2009 | Roberts et al. |
| 2009/0157686 | A1 | 6/2009 | Idicula et al. |
| 2009/0327904 | A1 | 12/2009 | Guzak et al. |
| 2010/0079462 | A1* | 4/2010 | Breeds ................. G06T 11/206 345/440 |
| 2010/0138420 | A1 | 6/2010 | Bator et al. |
| 2012/0066210 | A1 | 3/2012 | Mukerjee et al. |
| 2012/0096389 | A1 | 4/2012 | Flam et al. |
| 2014/0114907 | A1* | 4/2014 | Kozina ................. G06F 16/219 707/602 |
| 2014/0188946 | A1 | 7/2014 | Hartman |
| 2015/0012478 | A1* | 1/2015 | Mohammad .......... G06F 16/254 707/602 |
| 2015/0186478 | A1 | 7/2015 | Yan et al. |
| 2015/0347542 | A1* | 12/2015 | Sullivan .............. G06F 16/2455 707/602 |
| 2016/0125000 | A1 | 5/2016 | Meacham et al. |
| 2016/0191534 | A1 | 6/2016 | Mallozzi |
| 2016/0232229 | A1 | 8/2016 | Radivojevic |
| 2016/0342395 | A1 | 11/2016 | Kukolich et al. |
| 2016/0342678 | A1 | 11/2016 | Newman et al. |
| 2017/0039253 | A1 | 2/2017 | Bond |
| 2017/0091082 | A1 | 3/2017 | Ooshima et al. |
| 2017/0195183 | A1 | 7/2017 | Gershaft et al. |
| 2017/0221240 | A1 | 8/2017 | Stetson et al. |
| 2017/0262653 | A1 | 9/2017 | Dang et al. |
| 2017/0286526 | A1 | 10/2017 | Bar-Or et al. |
| 2017/0357648 | A1* | 12/2017 | Fink .................... G06F 16/2379 |
| 2017/0364534 | A1 | 12/2017 | Zhang et al. |
| 2018/0062953 | A1 | 3/2018 | Billore et al. |
| 2018/0067932 | A1 | 3/2018 | Paterson et al. |
| 2018/0129401 | A1 | 5/2018 | Kim et al. |
| 2018/0136983 | A1 | 5/2018 | Bequet et al. |
| 2018/0165072 | A1* | 6/2018 | Fink .................... G06F 9/4488 |
| 2018/0288098 | A1 | 10/2018 | Wang et al. |
| 2018/0314705 | A1* | 11/2018 | Griffith ................ G06F 16/185 |
| 2018/0329958 | A1 | 11/2018 | Choudhury et al. |
| 2018/0341651 | A1 | 11/2018 | Anderson et al. |
| 2019/0114335 | A1* | 4/2019 | Koenig ............... G06F 16/2455 |
| 2019/0188308 | A1 | 6/2019 | Simon et al. |
| 2019/0251272 | A1 | 8/2019 | Ravizza et al. |
| 2020/0210427 | A1* | 7/2020 | Dugan ................ G06F 21/6218 |
| 2021/0263973 | A1 | 8/2021 | Borochoff et al. |
| 2023/0122210 | A1 | 4/2023 | Borochoff et al. |
| 2023/0351287 | A1 | 11/2023 | Thompson et al. |

FOREIGN PATENT DOCUMENTS

| | | |
|---|---|---|
| EP | 3258393 | 12/2017 |
| EP | 3557443 | 10/2019 |
| WO | WO 2006/036290 | 4/2006 |
| WO | WO 2020/151308 | 7/2020 |

OTHER PUBLICATIONS

U.S. Appl. No. 16/681,051, Resource Grouping for Resource Dependency System and Graphical User Interface, filed Nov. 12, 2019.

Official Communication for European Patent Application No. 19169119.5 dated Nov. 29, 2021, 5 pages.

Official Communication for European Patent Application No. 19169119.5 dated Sep. 12, 2023, 7 pages.

Official Communication for European Patent Application No. 19169119.5 dated Jul. 2, 2019.

Official Communication for European Patent Application No. 16194936.7 dated Mar. 9, 2017.

U.S. Appl. No. 18/085,150, Resource Dependency System and Graphical User Interface, filed Dec. 20, 2022.

U.S. Appl. No. 18/337,332, Resource Grouping for Resource Dependency System and Graphical User Interface, filed Jun. 19, 2023.

Official Communication for European Patent Application No. 19169119.5 dated Apr. 2, 2024, 7 pages.

* cited by examiner

COLUMN LINEAGE FOR RESOURCE DEPENDENCY SYSTEM AND GRAPHICAL USER INTERFACE

INCORPORATION BY REFERENCE TO ANY RELATED APPLICATIONS

This application is a continuation of U.S. patent application Ser. No. 16/681,211, filed Nov. 12, 2019, and titled "COLUMN LINEAGE FOR RESOURCE DEPENDENCY SYSTEM AND GRAPHICAL USER INTERFACE" which claims the benefit of U.S. Provisional Patent Application No. 62/910,940, filed Oct. 4, 2019, entitled "COLUMN LINEAGE AND RESOURCE GROUPING FOR RESOURCE DEPENDENCY SYSTEM AND GRAPHICAL USER INTERFACE." Any and all applications for which a foreign or domestic priority claim is identified above and/or in the Application Data Sheet as filed with the present application are hereby incorporated by reference under 37 CFR 1.57 for all purposes and for all that they contain.

TECHNICAL FIELD

The present disclosure relates to systems and techniques for data integration, analysis, and visualization. More specifically, the present disclosure relates to the tracking of resource dependency relationships via a resource dependency system and the interactive user interfaces for displaying those resource dependency relationships.

BACKGROUND

Efficient retrieval of stored digital data and information is the focus of much commercial and academic attention. One way of retrieving resources (e.g., data sets or files) is through the use of hierarchical navigation, in which users are presented with a virtual folder hierarchy (i.e., nested folders) that can be navigated to locate the folder in which a target resource is stored. Users are free to view and interact with items inside these folders. Another common way of retrieving resources is with query-based searching, where users first generate a query specifying one or more properties of a target resource (e.g., a word it contains, date last modified, date created, partial resource name, etc.), and then the user selects the relevant resource when the query returns a set of results, typically returned in a list.

However, both hierarchical navigation and query-based searching can be occasionally inefficient and impractical to use. For instance, hierarchical navigation requires the use of folders, which conceals information about the resources within. The hierarchy of folders may be quite complex, which can take a long time to navigate and make it difficult for users to locate or recall the path to a specific resource. It may also be difficult to categorize resources into folders, since one resource may relate to multiple folders. Storing a copy of the resource in each folder may be an inefficient use of storage space. Similarly, query-based searching requires that a user come up with search terms or criteria beforehand to locate relevant resources. This makes query-based searching difficult to use and can reduce the likelihood of the user finding the correct resource when the user lacks the necessary information for compiling the search terms or criteria.

Furthermore, both hierarchical navigation and query-based searching are approaches that are poorly suited for use with managing and retrieving resources that include large quantities of related data sets; tracking and presenting any data dependencies across resources that may exist; and tracking the change of data over time as it is transformed, modified, and/or combined (e.g., into new data sets).

These situations often occur when there are large quantities of data (e.g., machine-generated data) that must be processed before they can be meaningfully used. The large amounts of data can be processed in multiple stages, such as through the use of a computerized data pipeline (also referred to as a data processing pipeline). A data pipeline can be implemented using a software platform, or an ad-hoc collection of computer software scripts and programs, for extracting data from "data sources", processing and transforming that data, and then providing the processed data to "data sinks." For instance, a data pipeline implemented for an insurance company may extract policy and claim data for individuals from a collection of different databases, and then transform and validate the insurance data to provide to various analytical platforms for the purposes of assessing risk management, compliance with regulations, fraud, and so forth. Thus, data pipelines can be used to provide a combination (e.g., a join) of data originating from multiple data sources and different data formats, enabling a data sink to have access to all of the data without having to be configured to handle the individual constituent data formats.

SUMMARY

The systems, methods, and devices described herein each have several aspects, no single one of which is solely responsible for its desirable attributes. Without limiting the scope of this disclosure, several non-limiting features will now be discussed briefly.

Dependencies can be formed as data sets are processed throughout the various stages of a data pipeline (e.g., transformed, modified, combined into new data sets, and so forth), and data sets at progressive stages of the data pipeline may be dependent on other data sets, including data sets earlier in the pipeline. In such instances, in which data and/or resources are dependent on one another or based on one another, it may be more efficient to track the dependencies among the resources instead of particular resource location(s).

A data pipeline system may be used with a resource dependency system in order to have the ability to trace and track data, including various versions of the data, as it moves through the data pipeline. This allows the data pipeline system to be used to determine and track these data dependencies between data sets and track the transformation of data throughout the data pipeline in a series of recorded steps. In some cases, the data pipeline system may include a software platform that provides analytical tools for visualizing and analyzing the data dependencies. For instance, a user interface can present a visual node graph, which can be a directed graph that shows each of the data sets of the data pipeline, the relationships or dependencies between related data sets, and any data transformations associated with those dependencies (e.g., the data modifications applied at each step of the data pipeline).

However, various opportunities may exist for improving resource dependency systems and their associated user interfaces, such as the improvements to user interfaces presenting the visual node graph, in ways that would provide additional flexibility, efficiency, and speed to a user analyzing a data pipeline and its data dependencies, while also increasing the depth of knowledge that can be gleaned from a quick glance of the visual node graph.

Disclosed herein are systems and methods for improvements to a resource dependency system and its associated user interfaces, which can be used in conjunction with a data pipeline system to trace and track data, including various versions of the data, as it moves through a data pipeline. A resource dependency system can be used to determine and track data dependencies between data sets and track the transformation of data throughout the data pipeline in a series of recorded steps. Its associated user interfaces can present a visual node graph, which can be a directed graph that shows data sets (e.g., of the data pipeline), the relationships or dependencies between related data sets, and any data transformations associated with those dependencies (e.g., the data modifications applied at each step of the data pipeline).

The improvements disclosed in the present disclosure include improvements to the resource dependency system for tracking data dependencies and data transformations at a higher level of granularity, such as tracking data dependencies and data transformations for individual columns of the data sets over the span of the data pipeline (referred to as a provenance or lineage of a column). The resource dependency system may generate, store, manage, and access the data dependencies and data transformations associated with the provenance/lineage of columns. It may also be able to generate a corresponding user interface based on selected column(s) of data that displays an updated visual node graph, which can conveying the data dependencies and data transformations associated with the provenance/lineage of the selected columns, in a manner that provides additional flexibility, efficiency, and speed to a user analyzing the data pipeline and its data dependencies, while also increasing the depth of knowledge that can be gleaned from a quick glance of the visual node graph.

The present disclosure also includes improvements to the user interfaces themselves and the corresponding improvements to the resource dependency system for enabling those user interface improvements. In particular, nodes representing resources in the visual node graph may be displayed differently based on relevant differences in the resources they represent, which can be set through various selectable criteria and schemes, examples of which include the relationship the represented resource has with projects, user permissions associated with the represented resource, filters for various parameters (e.g., file size) associated with the represented resources, and so forth. The user interface may include selectable options for visually arranging the nodes or grouping the nodes into superseding nodes according to how the nodes are displayed or the relevant differences in the resources they represent. The properties and dependencies associated with superseding nodes can be presented to the user. These features provide additional flexibility, efficiency, and speed to a user analyzing the data pipeline and its data dependencies, while also increasing the depth of knowledge that can be gleaned from a quick glance of the visual node graph.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of resource dependency, or data transformation, relationships and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In various implementations described herein, a computer-implemented methods is contemplated for processing and managing data set column lineage. The method may include, by one or more processors executing program instructions, the steps of: determining a selected column from a selected dataset; determining a first set of target columns comprising a target column from a first set of target datasets that are dependent on the selected column; and generating user interface data useable for rendering a graphical user interface. The graphical user interface may comprise: a representation of the selected dataset; a representation of the selected column, wherein the representation of selected column appears within the representation of selected dataset; representations of target datasets of the first set of target datasets; representations of target columns of the first set of target columns, wherein each representation of a target column appears within a corresponding representation of a target dataset that the respective target column is from; and an arrow or edge from the representation of the selected column to the representations of the target columns of the first set of target columns.

In some implementations, the method may further include determining a second set of target columns comprising a target column from a second set of target datasets that are indirectly dependent on the selected column, and the graphical user interface may additionally include: representations of target datasets of the second set of target datasets, wherein the representations of the target datasets of the second set of target datasets appear on the first side of the selected column; representations of target columns of the second set of target columns, wherein each representation of each target column of the second set of target columns appears within a corresponding representation of a target dataset that the respective target column is from; and for each representation of a target column of the second set of target columns, an arrow or edge from a representation of a column the respective target column is directly dependent on to the respective representation of the target column.

In some implementations, determining the first set of target columns involves accessing column lineage metadata associated with the selected column. In some implementations, the method may further include: accessing column metadata, wherein the column metadata indicates column lineage of columns in datasets and transformation code applied to generate the columns; and displaying through the graphical user interface a portion of the column metadata. In some implementations, the method may further include: accessing column metadata, wherein the column metadata indicates column lineage of columns in datasets and transformation code applied to generate the columns; and displaying the transformation code applied to generate the selected column through the graphical user interface.

In some implementations, the selected column is a column user-selected from a list of columns of the selected dataset, the list of columns presented to a user via a user interface. In some implementations, the representations of the target datasets of the first set of target datasets appear on a first side of the selected column. In some implementations, the method may further include determining a first set of source columns comprising a source column from a first set of source datasets that the selected column depends on, and the graphical user interface may further include: representations of source datasets of the first set of source datasets, wherein the representations of source datasets of the first set of source datasets appear on a second side of the selected dataset; representations of source columns of the first set of source columns, wherein each representation of a source column appears within a corresponding representation of a source dataset of the first set of source datasets that the respective source column is from; and an arrow or edge from the representations of the source columns of the first set of source columns to the representation of the selected column.

In some implementations, the method may further include determining a second set of source columns comprising a source column from a second set of source datasets that the selected column indirectly depends on, and the graphical user interface may further include: representations of source datasets of the second set of source datasets, wherein the representations of the source datasets of the second set of source datasets appear on the second side of the selected column; representations of source columns of the second set of source columns, wherein each representation of each source column of the second set of source columns appears within a corresponding representation of a source dataset that the respective source column is from; and for each representation of a source column of the second set of source columns, an arrow or edge from the respective representation of the source column to a representation of a column that is directly dependent on the respective source column. In some implementations, determining the first set of source columns involves accessing column lineage metadata associated with the selected column.

In various implementations, a computing system is contemplated that is configured for processing and managing data set column lineage. The computing system may include a computer readable storage medium having program instructions embodied therewith and one or more processors. The one or more processors may be configured to execute the program instructions to cause the computing system to: determine a selected column from a selected dataset; determine a first set of target columns comprising a target column from a first set of target datasets that are dependent on the selected column; and generate user interface data useable for rendering a graphical user interface. The graphical user interface may include: a representation of the selected dataset; a representation of the selected column, wherein the representation of selected column appears within the representation of selected dataset; representations of target datasets of the first set of target datasets; representations of target columns of the first set of target columns, wherein each representation of a target column appears within a corresponding representation of a target dataset that the respective target column is from; and an arrow or edge from the representation of the selected column to the representations of the target columns of the first set of target columns.

In some implementations, the one or more processors are further configured to execute the program instructions to cause the computing system to determine a second set of target columns comprising a target column from a second set of target datasets that are indirectly dependent on the selected column. The graphical user interface may further include: representations of target datasets of the second set of target datasets, wherein the representations of the target datasets of the second set of target datasets appear on the first side of the selected column; representations of target columns of the second set of target columns, wherein each representation of each target column of the second set of target columns appears within a corresponding representation of a target dataset that the respective target column is from; and for each representation of a target column of the second set of target columns, an arrow or edge from a representation of a column the respective target column is directly dependent on to the respective representation of the target column.

In some implementations, determining the first set of target columns involves accessing column lineage metadata associated with the selected column. In some implementations, the one or more processors are further configured to execute the program instructions to cause the computing system to: access column metadata, wherein the column metadata indicates column lineage of columns in datasets and transformation code applied to generate the columns; and display through the graphical user interface a portion of the column metadata. In some implementations, the one or more processors are further configured to execute the program instructions to cause the computing system to: access column metadata, wherein the column metadata indicates column lineage of columns in datasets and transformation code applied to generate the columns; and display the transformation code applied to generate the selected column through the graphical user interface.

In various implementations, a non-transitory computer-readable media is contemplated that includes computer-executable instructions that, when executed by a computing system, cause the computing system to perform operations comprising: determining a selected column from a selected dataset; determining a first set of target columns comprising a target column from a first set of target datasets that are dependent on the selected column; and generating user interface data useable for rendering a graphical user interface. The graphical user interface may include: a representation of the selected dataset; a representation of the selected column, wherein the representation of selected column appears within the representation of selected dataset; representations of target datasets of the first set of target datasets; representations of target columns of the first set of target columns, wherein each representation of a target column appears within a corresponding representation of a target dataset that the respective target column is from; and an arrow or edge from the representation of the selected column to the representations of the target columns of the first set of target columns.

In some implementations, the computer-executable instructions, when executed by a computing system, may further cause the computing system to perform operations comprising determining a second set of target columns comprising a target column from a second set of target datasets that are indirectly dependent on the selected column. The graphical user interface may further include: representations of target datasets of the second set of target datasets, wherein the representations of the target datasets of the second set of target datasets appear on the first side of the selected column; representations of target columns of the second set of target columns, wherein each representation of each target column of the second set of target columns appears within a corresponding representation of a target dataset that the respective target column is from; and for each representation of a target column of the second set of target columns, an arrow or edge from a representation of a column the respective target column is directly dependent on to the respective representation of the target column.

In some implementations, determining the first set of target columns involves accessing column lineage metadata associated with the selected column. In some implementations, the computer-executable instructions, when executed by a computing system, may further cause the computing system to perform operations including: accessing column metadata, wherein the column metadata indicates column lineage of columns in datasets and transformation code applied to generate the columns; and displaying through the graphical user interface a portion of the column metadata. In some implementations, the computer-executable instructions, when executed by a computing system, may further cause the computing system to perform operations including: accessing column metadata, wherein the column metadata indicates column lineage of columns in datasets and transformation code applied to generate the columns; and displaying the transformation code applied to generate the selected column through the graphical user interface.

In various implementations, a computer-implemented method of processing and managing a node-based and dependency-based data graph is contemplated. The method may be performed by one or more processors executing program instructions, and it may include: determining a grouping scheme associated with a visual node graph provided in a graphical user interface. The visual node graph may comprise: a plurality of nodes, wherein the nodes of the plurality of nodes represent resources; and one or more directed edges, wherein the directed edges of the one or more directed edges are drawn between respective pairs of nodes of the plurality of nodes and indicate directional dependencies between the pairs of nodes, wherein the grouping scheme specifies different node types. The method may additionally include: determining a display scheme associated with the visual node graph, wherein the display scheme specifies how nodes of different node types are displayed differently in the visual node graph; determining, based on the grouping scheme, a first set of nodes of the plurality of nodes are of a first node type and a second set of nodes of the plurality of nodes are of a second node type; displaying the first set of nodes and the second set of nodes in the visual node graph based on the display scheme; and updating the visual node graph in the graphical user interface by re-arranging the plurality of nodes based on the grouping scheme, such that the first set of nodes are presented as a first cluster and the second set of nodes are presented as a second cluster.

In some implementations, the display scheme is a coloration scheme specifying that different node types are colored differently in the visual node graph. In some implementations, the method may further include updating the visual node graph in the graphical user interface by: replacing the first set of nodes with a first grouped node; replacing the second set of nodes with a second grouped node; and drawing one or more directed edges between the first grouped node and the second grouped node based on directed edges between the first set of nodes and the second set of nodes.

In some implementations, the method may further include: receiving a selection of one or more nodes in the visual node graph; displaying through the graphical user interface information associated with the one or more selected nodes; and applying the display scheme to the one or more selected nodes.

In some implementations, the method may further include: receiving a selection of one or more nodes in the visual node graph; and displaying through the graphical user interface a breakdown of categories associated with the resources represented by the one or more selected nodes. In some implementations, the method may further include adding a second plurality of nodes to the visual node graph, wherein the second plurality of nodes represent all datasets associated with a project.

In some implementations, the grouping scheme is based on a user's permission levels associated with the resources represented by the plurality of nodes. In some implementations, the user is a different user than a user presented with the visual node graph. In some implementations, the user's permissions level associated with a resource comprises data access and resource access, wherein data access is permission for the user to access data the resource, and wherein resource access is permission for the user to discover the existence of the resource. In some implementations, the user is a different user than a user presented with the visual node graph, wherein the user's permissions level associated with a resource comprises permissions unknown, and wherein permissions unknown indicates the user presented with the visual node graph does not share a same permissions level as the user for the resource. In some implementations, the method may further include: receiving a selection of a node in the visual node graph; and updating the graphical user interface to include a listing of resources the user must have access to in order to access the resource represented by the selected node.

In various implementations, a computing system configured for processing and managing a node-based and dependency-based data graph is contemplated. The computing system may include: a computer readable storage medium having program instructions embodied therewith and one or more processors. The one or more processors may be configured to execute the program instructions to cause the computing system to: determine a grouping scheme associated with a visual node graph provided in a graphical user interface. The visual node graph may include: a plurality of nodes, wherein the nodes of the plurality of nodes represent resources; and one or more directed edges, wherein the directed edges of the one or more directed edges are drawn between respective pairs of nodes of the plurality of nodes and indicate directional dependencies between the pairs of nodes, wherein the grouping scheme specifies different node types. The one or more processors may be further configured to executed the program instructions to cause the computing system to: determine a display scheme associated with the visual node graph, wherein the display scheme specifies how nodes of different node types are displayed differently in the visual node graph; determine, based on the grouping scheme, a first set of nodes of the plurality of nodes are of a first node type and a second set of nodes of the plurality of nodes are of a second node type; display the first set of nodes and the second set of nodes in the visual node graph based on the display scheme; and update the visual node graph in the graphical user interface by re-arranging the plurality of nodes based on the grouping scheme, such that the first set of nodes are presented as a first cluster and the second set of nodes are presented as a second cluster.

In some implementations, the display scheme is a coloration scheme specifying that different node types are colored differently in the visual node graph. In some implementations, the one or more processors are further configured to execute the program instructions to cause the computing system to update the visual node graph in the graphical user interface by: replacing the first set of nodes with a first grouped node; replacing the second set of nodes with a second grouped node; and drawing one or more directed edges between the first grouped node and the second grouped node based on directed edges between the first set of nodes and the second set of nodes. In some implementations, the one or more processors are further configured to execute the program instructions to cause the computing system to: receive a selection of one or more nodes in the visual node graph; display through the graphical user interface information associated with the one or more selected nodes; and apply the display scheme to the one or more selected nodes. In some implementations, the one or more processors are further configured to execute the program instructions to cause the computing system to: receive a selection of one or more nodes in the visual node graph; and display through the graphical user interface a breakdown of categories associated with the resources represented by the one or more selected nodes.

In various implementations, non-transitory computer-readable media is contemplated that includes computer-executable instructions that, when executed by a computing system, cause the computing system to perform operations comprising: determining a grouping scheme associated with a visual node graph provided in a graphical user interface. The visual node graph may include: a plurality of nodes, wherein the nodes of the plurality of nodes represent resources; and one or more directed edges, wherein the directed edges of the one or more directed edges are drawn between respective pairs of nodes of the plurality of nodes and indicate directional dependencies between the pairs of nodes, wherein the grouping scheme specifies different node types. The non-transitory computer-readable media may further include computer-executable instructions that, when executed by a computing system, cause the computing system to perform operations comprising: determining a display scheme associated with the visual node graph, wherein the display scheme specifies how nodes of different node types are displayed differently in the visual node graph; determining, based on the grouping scheme, a first set of nodes of the plurality of nodes are of a first node type and a second set of nodes of the plurality of nodes are of a second node type; displaying the first set of nodes and the second set of nodes in the visual node graph based on the display scheme; and updating the visual node graph in the graphical user interface by re-arranging the plurality of nodes based on the grouping scheme, such that the first set of nodes are presented as a first cluster and the second set of nodes are presented as a second cluster.

In some implementations, the display scheme is a coloration scheme specifying that different node types are colored differently in the visual node graph. In some implementations, the computer-executable instructions, when executed by a computing system, further cause the computing system to update the visual node graph in the graphical user interface by: replacing the first set of nodes with a first grouped node; replacing the second set of nodes with a second grouped node; and drawing one or more directed edges between the first grouped node and the second grouped node based on directed edges between the first set of nodes and the second set of nodes. In some implementations, the computer-executable instructions, when executed by a computing system, further cause the computing system to perform operations including: receiving a selection of one or more nodes in the visual node graph; displaying through the graphical user interface information associated with the one or more selected nodes; and applying the display scheme to the one or more selected nodes.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
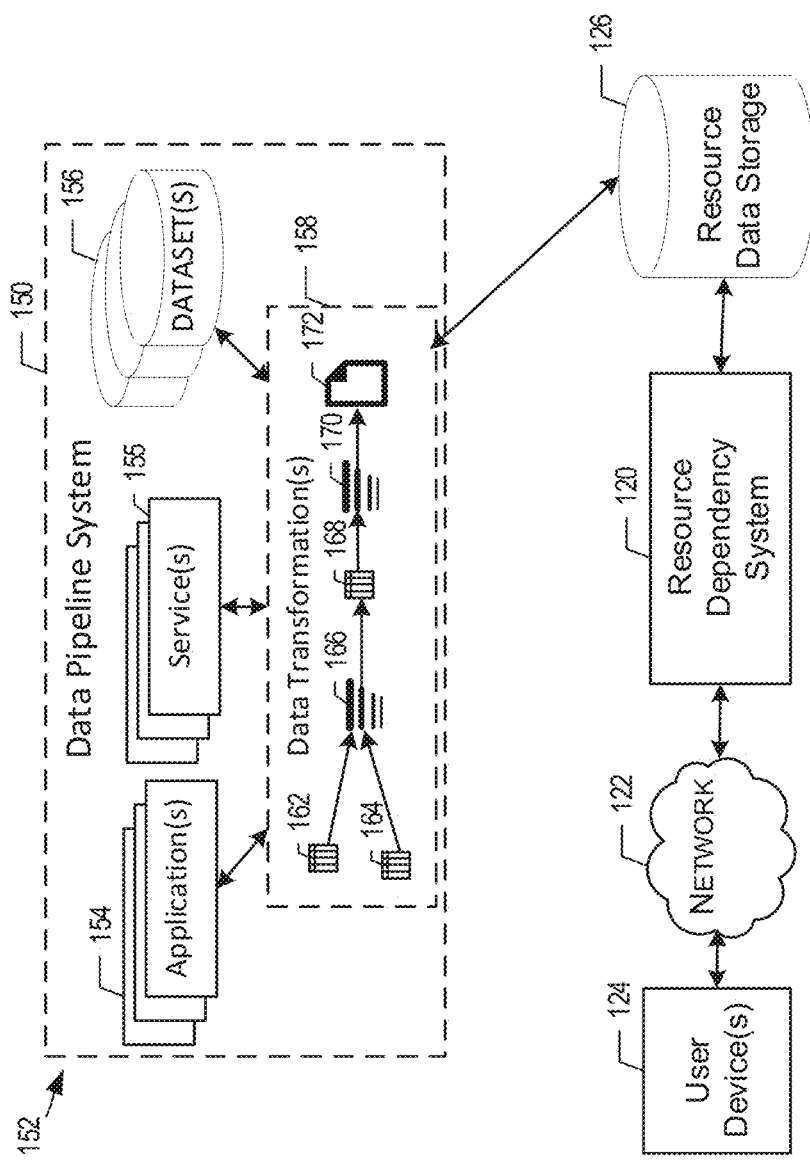
FIG. 1 is a system diagram that illustrates an example data pipeline system implementing an example resource dependency system, according to some embodiments of the present disclosure, according to various embodiments of the present disclosure.

Efficient retrieval of stored digital data and information is the focus of much commercial and academic attention. One way of retrieving resources (e.g., data sets or files) is through the use of hierarchical navigation, in which users are presented with a virtual folder hierarchy (i.e., nested folders) that can be navigated to locate the folder in which a target resource is stored. Users are free to view and interact with items inside these folders. Another common way of retrieving resources is with query-based searching, where users first generate a query specifying one or more properties of a target resource (e.g., a word it contains, date last modified, date created, partial resource name, etc.), and then the user selects the relevant resource when the query returns a set of results, typically returned in a list.

However, both hierarchical navigation and query-based searching can be occasionally inefficient and impractical to use. For instance, hierarchical navigation requires the use of folders, which conceals information about the resources within. The hierarchy of folders may be quite complex, which can take a long time to navigate and make it difficult for users to locate or recall the path to a specific resource. It may also be difficult to categorize resources into folders, since one resource may relate to multiple folders. Storing a copy of the resource in each folder may be an inefficient use of storage space. Similarly, query-based searching requires that a user come up with search terms or criteria beforehand to locate relevant resources. This makes query-based searching difficult to use and can reduce the likelihood of the user finding the correct resource when the user lacks the necessary information for compiling the search terms or criteria.

Furthermore, both hierarchical navigation and query-based searching are approaches that are poorly suited for use with managing and retrieving resources that include large quantities of related data sets; tracking and presenting any data dependencies across resources that may exist; and tracking the change of data over time as it is transformed, modified, and/or combined (e.g., into new data sets).

These situations often occur when there are large quantities of data (e.g., machine-generated data) that must be processed before they can be meaningfully used. The large amounts of data can be processed in multiple stages, such as through the use of a computerized data pipeline (also referred to as a data processing pipeline). A data pipeline can be implemented using a software platform, or an ad-hoc collection of computer software scripts and programs, for extracting data from "data sources", processing and transforming that data, and then providing the processed data to "data sinks." For instance, a data pipeline implemented for an insurance company may extract policy and claim data for individuals from a collection of different databases, and then transform and validate the insurance data to provide to various analytical platforms for the purposes of assessing risk management, compliance with regulations, fraud, and so forth. Thus, data pipelines can be used to provide a combination (e.g., a join) of data originating from multiple data sources and different data formats, enabling a data sink to have access to all of the data without having to be configured to handle the individual constituent data formats.

Dependencies can be formed as data sets are processed throughout the various stages of a data pipeline (e.g., transformed, modified, combined into new data sets, and so forth), and data sets at progressive stages of the data pipeline may be dependent on other data sets, including data sets earlier in the pipeline. In such instances, in which data and/or resources are dependent on one another or based on one another, it may be more efficient to track the dependencies among the resources instead of particular resource location(s).

A data pipeline system may be used with a resource dependency system in order to have the ability to trace and track data, including various versions of the data, as it moves through the data pipeline. This allows the data pipeline system to be used to determine and track these data dependencies between data sets and track the transformation of data throughout the data pipeline in a series of recorded steps. In some cases, the data pipeline system may include a software platform that provides analytical tools for visualizing and analyzing the data dependencies. For instance, a user interface can present a visual node graph, which can be a directed graph that shows each of the data sets of the data pipeline, the relationships or dependencies between related data sets, and any data transformations associated with those dependencies (e.g., the data modifications applied at each step of the data pipeline).

In general, a resource dependency system and its associated user interfaces are well-suited to allow a user to analyze a data pipeline, where data and/or resources are dependent on one another or based on one another, and track the dependencies among the resources in the data pipeline. The resources are often data sets (e.g., software code, a column in an excel sheet, or the like) that can comprise one or more dependency relationships to other data sets and/or resources as well. A user may be able to select a particular data set or resource on a visual node graph, and the user interface may display a number of options in the interface (e.g., as a pop-up window, or the like) on how to interact with the resource. The options can include, but are not limited to, the ability to view more detailed information about the selected data set, review or edit metadata associated with the data set, modify listed dependencies, and/or perform additional filtering, for example searching data sets containing text or that meet certain criteria, and displaying search results in an updated visual node graph.

A resource dependency system and its associated user interfaces may have many practical benefits. For instance, some organizations may implement database protocols, data creation and/or maintenance protocols, and/or any relevant best practices for how to organize and configure various resources and/or sets of data in a database. Thus, having a resource dependency system track and manage dependencies can further aid in verifying whether a particular resource is adhering to any particular relevant protocol(s). For example, if a resource comprises the correct content and is otherwise stored in a correct resource location, it may still comprise data that depends on another resource that is incorrect or improper. For example, the resource, which may depend on a duplicate resource of the intended resource, as of one date, may appear to be correct. However, once the intended resource is updated, the duplicate resource may not receive the same updates, and the out-of-date information would still be propagated to the original resource without any critical updates. Thus, even as data is transformed, modified, and/or combined into new data structures and beyond recognition, the resource dependency system and its associated user interfaces would allow users to constantly maintain and verify the data as it is being used.

However, various opportunities may exist for improving resource dependency systems and their associated user interfaces, such as the improvements to user interfaces presenting the visual node graph, in ways that would provide additional flexibility, efficiency, and speed to a user analyzing a data pipeline and its data dependencies, while also increasing the depth of knowledge that can be gleaned from a quick glance of the visual node graph.

The improvements disclosed in the present disclosure include improvements to the resource dependency system for tracking data dependencies and data transformations at a higher level of granularity, such as tracking data dependencies and data transformations for individual columns of the data sets over the span of the data pipeline (referred to as a provenance or lineage of a column). The resource dependency system may generate, store, manage, and access the data dependencies and data transformations associated with the provenance/lineage of columns. It may also be able to generate a corresponding user interface based on selected column(s) of data that displays an updated visual node graph, which can conveying the data dependencies and data transformations associated with the provenance/lineage of the selected columns, in a manner that provides additional flexibility, efficiency, and speed to a user analyzing the data pipeline and its data dependencies, while also increasing the depth of knowledge that can be gleaned from a quick glance of the visual node graph.

Thus, a user may be able to use the user interface to drill into any particular node of the visual node graph and select any particular column(s) of data within the represented data set. The resource dependency system may access data describing a lineage of the selected column(s) of data and generate a user interface displaying an updated visual node graph that includes representations of the selected node, the selected column(s) within that node, and edges connecting the column(s) with other columns in other data sets upstream and downstream that depend on the selected column(s). The user interface may also inform the user of the data transformations applied to the selected column applied at each step of the data pipeline, allowing the user to view any data transformations associated with the shown dependencies.

To implement this, columns in a data set may be associated with column metadata that provides information about a particular column. Column metadata may include user comment metadata (e.g., user comments for a respective column), column level access control metadata (e.g., policy to restrict access to a respective column or the data within to a user having adequate authority), and also column lineage metadata, which describes a column's provenance, such that the column lineage metadata identifies the origins and history of a column through the column's life cycle (e.g., from the source column(s) in the source data set to the target column in a target dataset from a particular data transformation step in the data pipeline). For instance, column lineage metadata can describe each transformation step of column through its life cycle and at each transformation step can describe the source column(s) in one or more source data sets used to generate one or more columns in one or more target data sets, identify the history (e.g., earlier iterations or transformations) of the source column(s), identify how the source column(s) were transformed (e.g., renamed, database operations, function, etc.), and identify the transformation code used at the transformation step. Provenance of a dataset, and in particular column provenance of columns of a dataset, can help users or systems determine whether a given dataset is trustworthy. An error or mistake in a dataset can propagate through the data pipeline if left uncorrected. Such an error or mistake can cause many problems including, for example, inaccurate data, failure of downstream processes that rely on the data set, and so forth. Column lineage metadata provides granularity with respect to a column's history, which can be invaluable for identifying and correcting propagated errors in datasets.

Thus, aspects of the present disclosure include implementations for tracking and presenting column provenance (also referred to as column lineage) using resource dependency systems and their associated user interfaces, such that dependencies and transformations can be tracked for individual columns among data sets over the entire span of the data pipeline. This is done by using column lineage metadata for selected column(s) of interest in order to determine the direct and indirect dependency relationships that the selected column(s) may have with upstream and downstream columns in a data pipeline.

The present disclosure also includes improvements to the user interfaces themselves and the corresponding improvements to the resource dependency system for enabling those user interface improvements. In particular, nodes representing resources in the visual node graph may be displayed differently based on relevant differences in the resources they represent, which can be set through various selectable criteria and schemes, examples of which include the relationship the represented resource has with projects, user permissions associated with the represented resource, filters for various parameters (e.g., file size) associated with the represented resources, and so forth. The user interface may include selectable options for visually arranging the nodes or grouping the nodes into superseding nodes according to how the nodes are displayed or the relevant differences in the resources they represent. The properties and dependencies associated with superseding nodes can be presented to the user. These features provide additional flexibility, efficiency, and speed to a user analyzing the data pipeline and its data dependencies, while also increasing the depth of knowledge that can be gleaned from a quick glance of the visual node graph.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data pipeline (or data processing pipeline): An ordered set of logic (e.g., a collection of computer software scripts or programs) that performs a multi-step transformation of data obtained from data sources to produce one or more output data sets. Each data transformation step may apply transformation code to one or more source datasets (also referred to as initial data sets, parent data sets, or input data sets) to produce one or more output data sets (also referred to as target data sets, derive data sets, or child data sets). For example, the data pipeline may include software code (e.g., transformation code) that defines a set of instructions to transform source columns of one or more source datasets into target columns of one or more target data sets. It should be noted that a data set may be both a source and a target data set, since a target data set can become a source data set if it is used to generate subsequent data sets.

Node: As referred to herein, a node may refer to a node, vertex, or point of a graph (e.g., a directed acyclic graph or similar data structure). A node may also refer to a representation (e.g., of a resource, such as a data set) in a visual node graph that can be displayed through a user interface in order to convey dependency relationships between the represented resources. The meaning associated with each use of the term "node" can be determined from the context surrounding the use of the term. It should be noted that a visual node graph may be generated based on a graph data structure, such that a node in the visual node graph may correspond to an actual node of the graph referenced by the visual node graph.

Example Data Pipeline System and Resource Dependency System for Tracking and Displaying Resource Dependencies and Groupings FIG. 1 illustrates an example data pipeline system 150 implementing an example resource dependency system 120, according to some embodiments of the present disclosure. The data pipeline system 150 may operate within a computing environment 152. In some embodiments, the computing environment 152 may include a network 122, a resource dependency system 120, user device(s) 124, and a resource data storage 126. However, various components may be combined with other components, or at the very least, the functionality of certain components may be performed by other components. For example, the resource data storage 126 can be included in the resource dependency system 120.

The data pipeline system 150 may include one or more applications 154, one or more services 155, one or more initial data sets 156, and a data transformation process 158 (also referred to herein as a build process). The data pipeline system 150 can transform data and record the data transformations. The one or more applications 154 can include applications that enable users to view data sets, interact with data sets, filter data sets, and/or configure data set transformation processes or builds. The one or more services 155 can include services that can trigger the data transformation builds and API services for receiving and transmitting data. The one or more initial data sets 156 can be automatically retrieved from external sources and/or can be manually imported by a user. The one or more initial data sets 156 can be in many different formats such as a tabular data format (SQL, delimited, or a spreadsheet data format), a data log format (such as network logs), or time series data (such as sensor data). In various implementations, the data sets 156 may be stored within the resource data storage 126.

The data pipeline system 150, via the one or more services 155, can apply the data transformation process 158. An example data transformation process 158 is shown. The data pipeline system 150 can receive one or more initial data sets 162, 164. The data pipeline system 150 can apply a transformation to the data set(s). For example, the data pipeline system 150 can apply a first transformation 166 to the initial data sets 162, 164, which can include joining the initial data sets 162, 164 (such as or similar to a SQL JOIN), and/or a filtering of the initial data sets 162, 164. The output of the first transformation 166 can include a modified data set 168. A second transformation 170 of the modified data set 168 can result in an output data set 172, such as a report. Each of the steps in the example data transformation process 158 can be recorded by the data pipeline system 150 and made available as a resource. For example, a resource can include a data set and/or a data set item, a transformation, or any other step in a data transformation process. As mentioned above, the data transformation process or build 158 can be triggered by the data pipeline system 150, where example triggers can include nightly build processes, detected events, or manual triggers by a user. Additional aspects of data transformations and the data pipeline system 150 are described in further detail below.

The techniques for recording and transforming data in the data pipeline system 150 may include maintaining an immutable history of data recording and transformation actions such as uploading a new data set version to the data pipeline system 150 and transforming one data set version to another data set version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "data sets." More specifically, a data set may encompass an ordered set of conceptual data set items. The data set items may be ordered according to their version identifiers recorded in the catalog. Thus, a data set item may correspond to a particular version of the data set. A data set item may represent a snapshot of the data set at a particular version of the data set. As a simple example, a version identifier of '1' may be recorded in the catalog for an initial data set item of a data set. If data is later added to the data set, a version identifier of '2' may be recorded in the catalog for a second data set item that conceptually includes the data of the initial data set item and the added data. In this example, data set item '2' may represent the current data set version and is ordered after data set item '1'.

As well as being versioned, a data set may be immutable. That is, when a new version of the data set corresponding to a new data set item is created for the data set in the system, pre-existing data set items of the data set are not overwritten by the new data set item. In this way, pre-existing data set items (i.e., pre-existing versions of the data set) are preserved when a new data set item is added to the data set (i.e., when a new version of the data set is created). Note that supporting immutable data sets is not inconsistent with pruning or deleting data set items corresponding to old data set versions. For example, old data set items may be deleted from the system to conserve data storage space.

A version of a data set may correspond to a successfully committed transaction against the data set. In these embodiments, a sequence of successfully committed transactions against the data set corresponds to a sequence of data set versions of the data set (i.e., a sequence of data set items of the data set).

A transaction against a data set may add data to the data set, edit existing data in the data set, remove existing data from the data set, or a combination of adding, editing, or removing data. A transaction against a data set may create a new version of the data set (i.e., a new data set item of the data set) without deleting, removing, or modifying pre-existing data set items (i.e., without deleting, removing, or modifying pre-existing data set versions). A successfully committed transaction may correspond to a set of one or more files that contain the data of the data set item created by the successful transaction. The set of files may be stored in a file system.

In the catalog, a data set item of a data set may be identified by the name or identifier of the data set and the data set version corresponding to the data set item. In a preferred embodiment, the data set version corresponds an identifier assigned to the transaction that created the data set version. The data set item may be associated in the catalog with the set of files that contain the data of the data set item. In a preferred embodiment, the catalog treats the set of files as opaque. That is, the catalog itself may store paths or other identifiers of the set of files but may not otherwise open, read, or write to the files.

In sum, the catalog may store information about data sets. The information may include information identifying different versions (i.e., different data set items) of the data sets. In association with information identifying a particular version (i.e., a particular data set item) of a data set, there may be information identifying one or more files that contain the data of the particular data set version (i.e., the particular data set item).

The catalog may store information representing a non-linear history of a data set. Specifically, the history of a data set may have different data set branches. Branching may be used to allow one set of changes to a data set to be made independent and concurrently of another set of changes to the data set. The catalog may store branch names in association with data set version identifiers for identifying data set items that belong to a particular data set branch.

The catalog may provide data set provenance at the transaction level of granularity. As an example, suppose a transformation is executed in the data pipeline system 150 multiple times that reads data from data set A, reads data from data set B, transforms the data from data set A and the data from data set B in some way to produce data set C. As mentioned, this transformation may be performed multiple times. Each transformation may be performed in the context of a transaction. For example, the transformation may be performed daily after data sets and B are updated daily in the context of transactions. The result being multiple versions of data set A, multiple versions of data set B, and multiple versions of data set C as a result of multiple executions of the transformation. The catalog may contain sufficient information to trace the provenance of any version of data set C to the versions of data sets A and B from which the version of data set C is derived. In addition, the catalog may contain sufficient information the trace the provenance of those versions of data sets A and B to the earlier versions of data sets A and B from which those versions of data sets A and B were derived.

The provenance tracking ability is the result of recording in the catalog for a transaction that creates a new data set version, the transaction or transactions that the given transaction depends on (e.g., is derived from). The information recorded in the catalog may include an identifier of each dependent transaction and a branch name of the data set that the dependent transaction was committed against.

According to some embodiments, provenance tracking extends beyond transaction level granularity to column level granularity. For example, suppose a data set version A is structured as a table of two columns and a data set version B is structured as a table of five columns. Further assume, column three of data set version B is computed from column one of data set version A. In this case, the catalog may store information reflecting the dependency of column three of data set version B on column one of data set version A.

The catalog may also support the notion of permission transitivity. For example, suppose the catalog records information for two transactions executed against a data set referred to in this example as "Transaction 1" and "Transaction 2." Further suppose a third transaction is performed against the data set which is referred to in this example as "Transaction 3." Transaction 3 may use data created by Transaction 1 and data created by Transaction 2 to create the data set item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column-level. In this case, permission may be revoked (or granted) on a particular column of a data set and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output data set to be computed based on one or more input data sets each represented by a node in the graph with a directed edge between node(s) representing the input data set(s) and the node representing the output data set. The build service traverses the DAG in data set dependency order so that the most upstream dependent data sets are computed first. The build service traverses the DAG from the most upstream dependent data sets toward the node representing the output data set rebuilding data sets as necessary so that they are up-to-date. Finally, the target output data set is built once all of the dependent data sets are up-to-date.

The data pipeline system 150 can support branching for both data and code. Build branches allow the same transformation code to be executed on multiple branches. For example, transformation code on the master branch can be executed to produce a data set on the master branch or on another branch (e.g., the develop branch). Build branches also allow transformation code on a branch to be executed to produce data sets on that branch. For example, transformation code on a development branch can be executed to produce a data set that is available only on the development branch. Build branches provide isolation of re-computation of graph data across different users and across different execution schedules of a data pipeline. To support branching, the catalog may store information represents a graph of dependencies as opposed to a linear dependency sequence.

The data pipeline system 150 may enable other data transformation systems to perform transformations. For example, suppose the system stores two "raw" data sets R1 and R2 that are both updated daily (e.g., with daily web log data for two web services). Each update creates a new version of the data set and corresponds to a different transaction. The data sets are deemed raw in the sense that transformation code may not be executed by the data pipeline system 150 to produce the data sets. Further suppose there is a transformation A that computes a join between data sets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all data sets that depend on an upstream data set or an upstream transformation that has been updated are automatically determined based on information in the catalog and rebuilt. In this case, the build service may accept a target data set or a target transformation as an input parameter to a push build command. The build service than determines all downstream data sets that need to be rebuilt, if any.

As an example, if the build service receives a push build command with data set R1 as the target, then the build service would determine all downstream data sets that are not up-to-date with respect to data set R1 and rebuild them. For example, if data set D1 is out-of-date with respect to data set R1, then data set D1 is rebuilt based on the current versions of data sets R1 and R2 and the current version of transformation A. If data set D1 is rebuilt because it is out-of-date, then data set D2 will be rebuilt based on the up-to-date version of data set D1 and the current version of transformation B and so on until all downstream data set of the target data set are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a data set or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from data sets and those updates to be tracked separately. For example, suppose a comma separated file is uploaded to the system as particular data set version. The catalog may store in association with the particular data set version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of data sets and schema information. For example, suppose transformation A described above in a previous example that accepts the data set R1 and data set R2 as input is the target of a build command issued to the build service. In response to this build command, the build service may determine from the catalog the file or files in which the data of the current versions of data sets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

In various implementations, the dependencies between data sets may be stored in resource data storage 126 and be managed by the resource dependency system 120. For instance, the catalog may track data set provenance at the transaction level or column level of granularity, as well as permission transitivity at the transaction level or column level of granularity. These sorts of dependencies among all the data sets may be managed by the resource dependency system 120 and stored in resource data storage 126. For instance, if a transformation executed in the data pipeline system 150 produces data set C based on data read from data set A and data set B, and then produced data set D based on the data in data set C, then data set D would be dependent on data set C, which is in-turn dependent on data set A and data set B. The catalog may store the information needed to trace this provenance. However, the resource dependency system 120 and the resource data storage 126 may further store or represent the relationship within graphs or graph-like structures, such as a directed graph with nodes and edges. The nodes may represent resources and the edges (e.g., lines) between the nodes may represent relationships between the nodes. For instance, in the previous example, there may be a set of nodes, with data set A, B, C, and D represented by nodes A, B, C, and D. There could be an edge from A to C and an edge from B to C to indicate the dependence of C on A and B, as well as an edge from C to D to indicate the dependence of D on C.

Thus, the nodes of the graph may represent different information, such as dependency relationships, data sets, data transformations, or files, for example. The edges of the graph may represent relationships between the nodes. The data corresponding to the graph may be created or updated in various ways, including those described herein, comprising both manual and automatic processes. In some implementations, the data corresponding to the graph in the database may be created and/or interacted with visually through various graphical user interfaces. Advantageously, this allows the user to interact with the data objects by placing, dragging, linking and deleting visual entities on a graphical user interface. In some embodiments, the data corresponding to the graph may be converted to a low-level (i.e. node list) representation as well.

In various implementations, the resource data storage 126 and resource dependency system 120 may also store clusters, which may be considered as a set of graphs which may be disjoint. The resource data storage 126 and resource dependency system 120 may also maintain data structures such as adjacency lists, which may be used to represent a graph or cluster. Advantageously, adjacency lists, may allow storing of graphs in memory efficiently, particularly where the graphs are lightly-connected graphs or clusters (e.g. graphs or clusters wherein the number of nodes is high compared to the number of linkages per node). Adjacency lists may also allow for efficient adding and removal of nodes, e.g. as an operation in constant time, as entries related to nodes that are not connected to the added or removed nodes may not need to be accessed.

In various implementations, the resource data storage 126 and resource dependency system 120 may store data structures such as adjacency matrices, which may also be used to represent a graph or cluster. Advantageously, adjacency matrices may allow for more efficient storage and processing of highly-connected graphs or clusters, e.g. where the number of connections per node is comparable to the number of nodes. Adjacency matrices may also allow for more efficient access and processing, particularly vectorized access and processing (e.g. using specialized hardware or processor instructions for matrix math), to the graph or cluster data because each matrix row corresponding to a node may have the same size irrespective of the number of linkages by node.

As described herein, various data items may be stored, processed, analyzed, etc. via graph-related data structures (including adjacency lists or adjacency matrices), which may provide various storage and processing efficiency advantages, such as the ability to handle a high volume of highly connected data, efficiency in computing relationship queries in comparison to traditional databases (e.g., using adjacency matrices, or adjacency lists), the ability to easily add to the existing structure without endangering current functionality, the structure and schema of a graph model can easily flex to accommodate new data types and relationships, the ability to evolve in step with the rest of the application and any changing business data requirements, the ability to easily add weights to edges, utilization of the optimal amount of computer memory, and so forth.

Figure 3A:
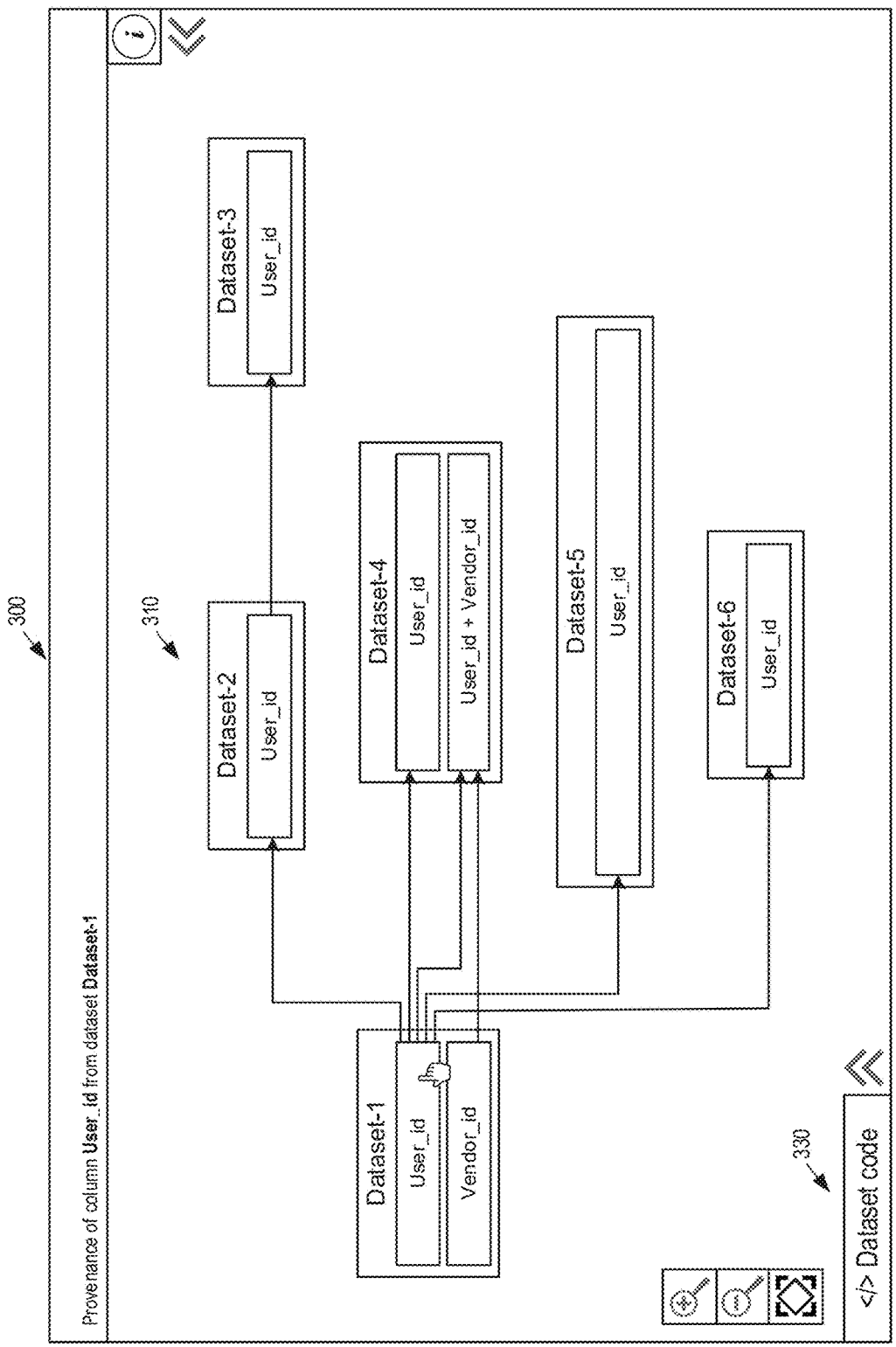
FIGS. 3A and 3B illustrate example user interfaces associated with displaying resource dependencies using a resource dependency system, according to various embodiments of the present disclosure.
Figure 3B:
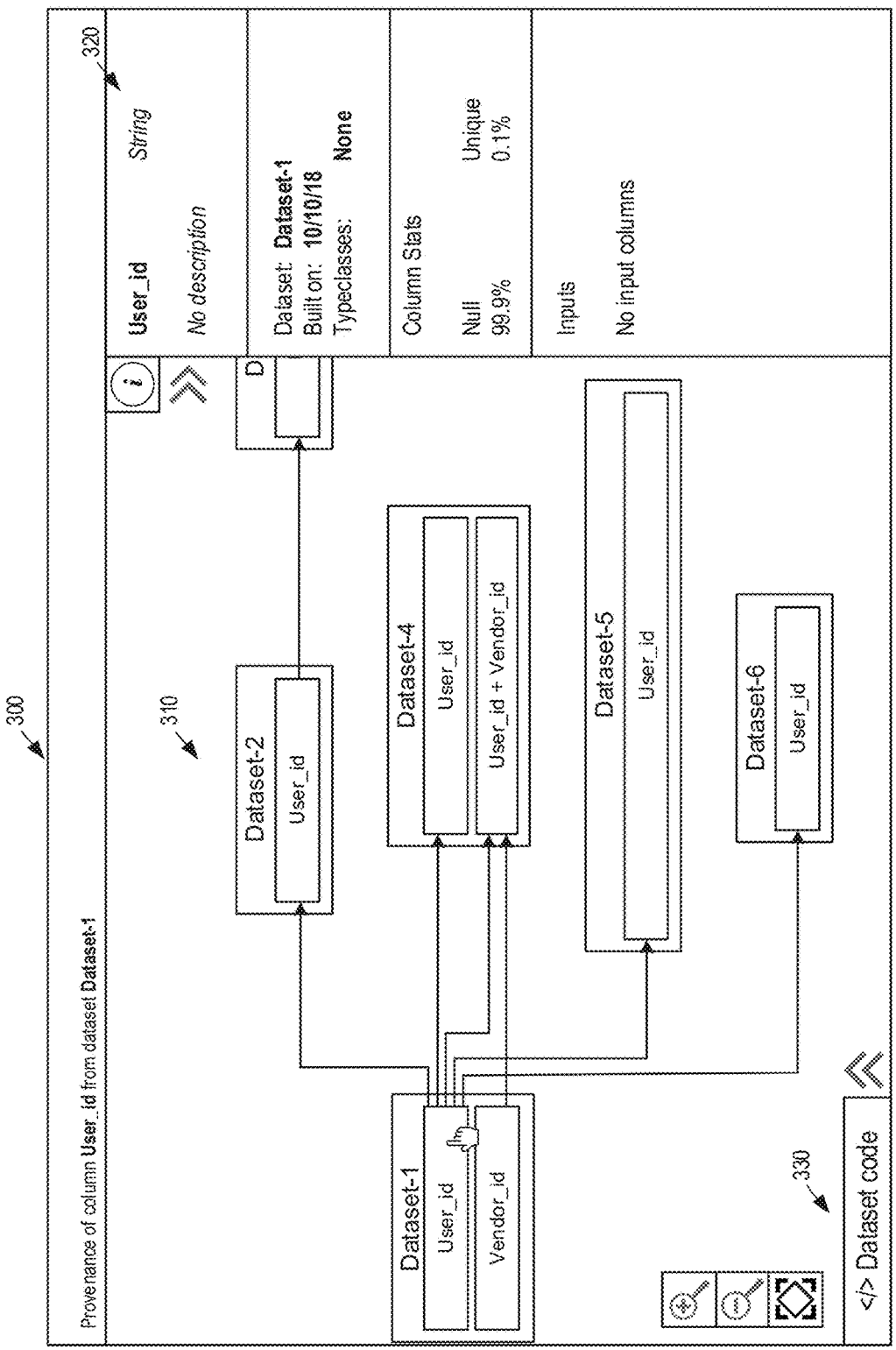

In various implementations, the resource dependency system 120 may be able to retrieve (e.g., from the data structures within the resource data storage 126) and present the relationships and dependencies between resources, as desired, to a user. For instance, the resource dependency system 120 may provide the dependencies through network 122 to be displayed on a user interface rendered on user device(s) 124. Examples of such user interfaces are shown in FIGS. 3A and 3B, as well as FIGS. 5A, 5B, 6A-C, 7A, 7B, and 8. In various implementations, the dependencies and relationships between the resources may also be provided and displayed through the applications 154 of the data pipeline system 150, which can be helpful when configuring data set transformation processes or builds.

The network 122 may include, for example, the Internet, intranets, extranets, wide area networks (WANs), local area networks (LANs), wired networks, wireless networks, other suitable networks, or any combination of two or more such networks. For example, the network 122 may be a combination of satellite networks, cable networks, Ethernet networks, and other types of networks.

The user device(s) 124 may include processor-based systems such as computer systems, desktop computers, laptop computers, tablet computers, personal digital assistants, cellular telephones, smart phones, set-top boxes, game consoles, electronic book readers, or other devices with similar capability.

In various implementations, the resource dependency system 120 may be integrated with, or a part of, the data pipeline system 150. In various implementations, the resource dependency system 120 may operate on one or more computing devices (e.g., a server computer) that can be positioned in a single location or multiple geographical locations. In some cases, the one or more computing devices may be part of a hosted computing resource, a grid computing resource, or any other distributed computing arrangement. In some cases, the resource dependency system 120 may correspond to an elastic computing resource where the allotted capacity of processing, network, storage, or other computing-related resources may vary over time.

The resource data storage 126 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. The resource data storage 126 may store sets of data in structured and/or unstructured formats that can be divided or extracted as needed. For instance, in some implementations, the various versions of data sets may be stored in one or more databases, such as relational databases that organize information or data into tables, columns, rows, or similar organizational groupings. Groupings of information may be linked or referenced via the use of keys (e.g., key-value pairs).

Any resources (e.g., files or the data sets 156) associated with various data pipelines may be stored in the resource data storage 126. In various implementations, the resource data storage 126 may store the aforementioned catalog or aspects of the catalog, such as: different versions of data sets, including versions of target or derived data sets that are dependent on other data sets; information identifying a particular version (i.e., a particular data set item) of a data set; information about files containing the data of a particular version of a data set; immutable histories of data recording and transformation actions associated with the data sets; the sequences of successfully committed transactions applied to the data sets (which may include the code, instructions, or logic for the data transformations applied to data sets); the permissions or access levels granted for various data sets or columns to different users; dependency relationships between data sets, such as data set or column provenance for the various versions of data sets, the structure of data pipelines and the position of data sets within the data pipelines, or the permission transitivity between data sets or columns in accordance with established policies; and any other relevant information about the data sets.

More specifically, the resource data storage 126 may store immutable versions of data sets, which makes it possible to trace the data in a target data set to the source dataset(s) used to derive that data, even if the current versions of source dataset(s) are no longer available or no longer contain the relevant data. Each version of a data set may represent a corresponding snapshot of the data set, which captures the state of the data set at the point in time that the snapshot was created. The resource data storage 126 may also store versions of transformation code, which also makes it possible to determine the version of transformation code used to generate a target data set and track down errors in a data set that may be introduced by errors in the version of transformation code used to build that data set. The resource data storage 126 may also store information about various data pipelines, which may include identifiers or references to the various versions or snapshots of data sets used in the data pipelines. In addition to transformation code, the resource data storage 126 may also store column metadata for various columns in data sets (e.g., a target column of a target data set), which can include various metadata items such as user comment metadata, column level access control metadata, or column lineage metadata.

Figure 2:
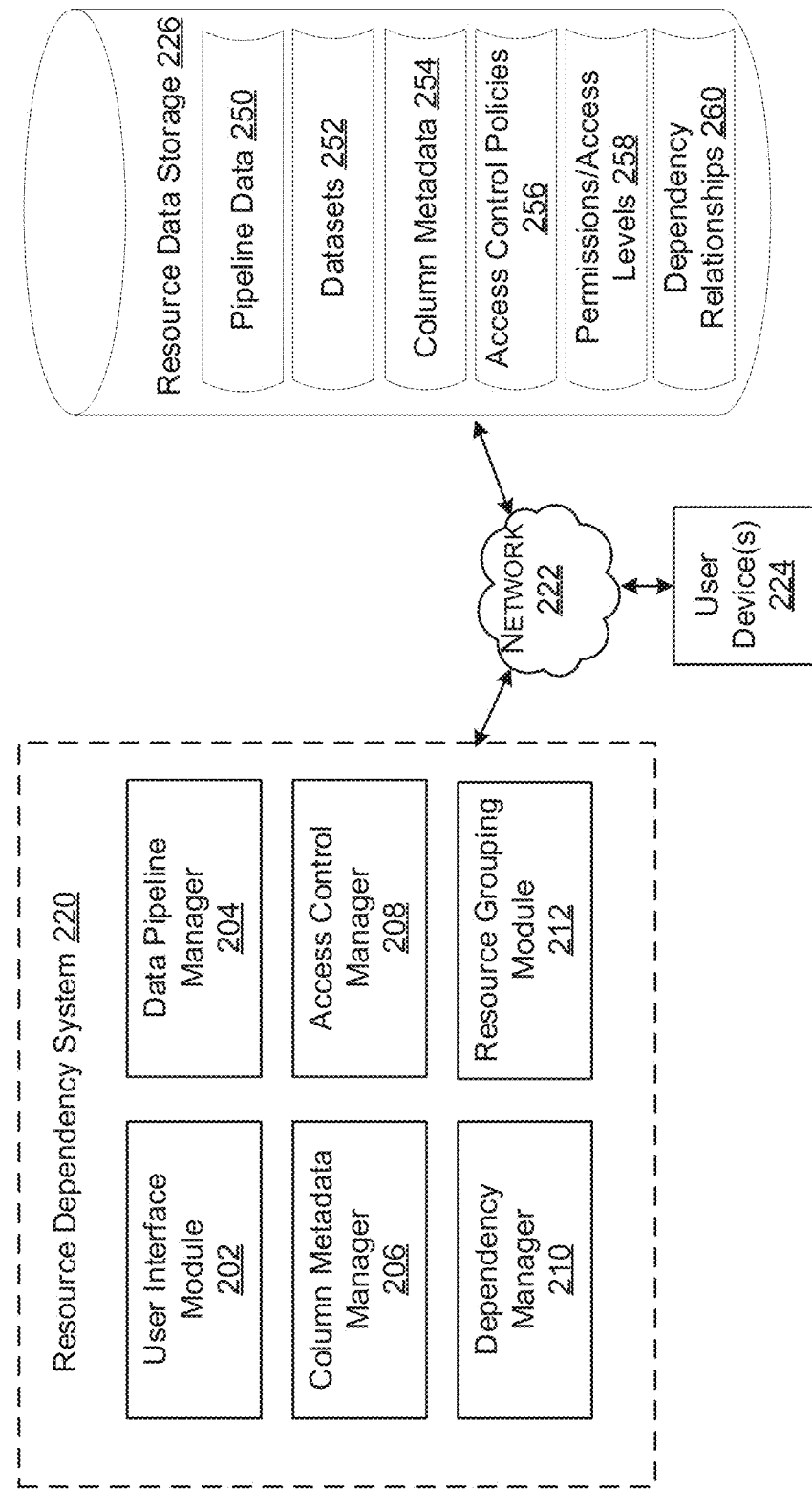
FIG. 2 is block diagram that illustrates components of a resource dependency system and an associated resource data storage, according to various embodiments of the present disclosure.

FIG. 2 is a block diagram illustrating components of a resource dependency system 220 (e.g., similar to resource dependency system 120) and an associated resource data storage 226 (e.g., similar to the resource data storage 126). In various implementations, the resource data storage 226 may be connected to the resource dependency system 220 via a network 222, and the resource dependency system 220 may also be connected to user device(s) 224 (e.g., similar to user device(s) 124) via the network 222. The resource dependency system 220 may be able to retrieve and present the relationships and dependencies among resources to users operating the user device(s) 224; the resource dependency system 220 may send the relevant information over the network 222 to the user device(s) 224 in order to generate visual node graphs in user interfaces rendered on the user device(s) 224.

In various implementations, the resource dependency system 220 may include components such as a user interface module 202, a data pipeline manager 204, a column metadata manager 206, an access control manager 208, a dependency manager 210, and a resource grouping module 212. In various implementations, the resource storage system 226 may include pipeline data 250, data sets 252, column metadata 254, access control policies 256 (e.g., column level and/or data set level access control policies), permissions/access levels 258, and dependency relationships 260.

The user interface module 202 of the resource dependency system 220 may be configured for generating user interface data useable for rendering a user interface on the user device(s) 224. The user interface may include a visual node graph, and the user interface module 202 may be configured to generate the user interface data for correctly presenting the visual node graph to the user. The visual node graph may include nodes representing resources, such as a node representing each column in a complete column lineage. The visual node graph may further include arrows, lines, or edges connecting the nodes. Each edge may represent a dependency relationship between the resources represented by the two nodes, such as a derivation dependency (e.g., a transformation involving a mapping, database operation, function, etc.) between one or more source columns represented by one or more nodes and a target column represented by a different node.

The user interface module 202 may be configured to operate with the dependency manager 210 in order to determine and portray dependency relationships between resources through the visual node graph (e.g., as arrows, lines, or edges between two nodes in the visual node graph). The user interface module 202 may also be configured to operate with the resource grouping module 212 in order to determine and portray various groupings of resources through the visual node graph (e.g., by rearranging nodes in the visual node graph into clusters or grouping nodes of the same type under a single node) based on various grouping and display schemes. The user interface module 202 may also be configured to receive user inputs from the user (e.g., via the user device(s) 224) and update the visual node graph and/or the user interface in response to the user input. Thus, the user interface may, for instance, allow a user to view a visual node graph displaying column lineage and edit column relationships or column metadata (e.g., the column metadata 254 via the column metadata manager 206) if needed.

The data pipeline manager 204 of the resource dependency system 220 may be configured for managing, storing, and retrieving the pipeline data 250 within the resource data storage 226. The pipeline data 250 may include data pertaining to a data pipeline, including the overall structure of the data pipeline and the transformation code of various data transformation steps of the data pipeline. In various implementations, transformation code can be in one or more programming languages. The transformation code can include specifications of source dataset(s), source columns of the source dataset(s), one or more target dataset(s), one or more target columns of the target dataset(s), and one or more operations or functions to be performed on the source columns in order to generate the one or more target columns. In some cases, the source columns and the one or more target columns may all have names that are referenced in the transformation code. The data pipeline may be structured such that transformation code is applied to one or more source data sets to generate one or more target datasets, which may in turn be used as input to which additional transformation code is applied to generate additional target data sets, and so on. In other words, the pipeline data 250 may indicate the transformation code applied to the data sets at each step of a data pipeline and the order in which the transformation code is to be applied and to which data sets. Data transformation code may be versioned and stored under pipeline data 250 within the resource data storage 226, and versions of data transformation code may link or reference the versions of source data sets that the transformations are applied to. This may provide the data pipeline manager 204 with the ability to trace data in a target data set to a particular version of a source data set containing the data that the target data set is based on, as well as the ability to determine the version of the transformation code used to build the target dataset.

The data pipeline manager 204 may also be configured for managing, storing, and retrieving the various datasets 252 (e.g., the source and target dataset(s) of various data pipelines) within the resource data storage 226. The data pipeline manager 204 may also manage an immutable history of each data set, which can be based on numerous versions or snapshots of the data set as the data set changes over time (e.g., due to updates to the data or transformations applied to the data set).

The column metadata manager 206 of the resource dependency system 220 may be configured for generating, storing, managing, and retrieving column metadata 254 in the resource data storage 226 for columns of a data set. In particular, column metadata may be generated for columns of a target data set and stored by the column metadata manager 206 in the resource data storage 226 when the target data set is created (e.g., by application of transformation code to one or more source data sets). For instance, transformation code can be defined and executed for each data transformation step of a data pipeline in order to generate one or more target data sets used in the data pipeline. During this process, column metadata can be generated for a target column of a target dataset and stored as column metadata 254.

The column metadata for a target column (e.g., target column metadata) may include various types of metadata associated with the column, including various types of column lineage metadata describing the column's provenance. In various implementations, the complete column lineage metadata for a column can include two components: recent column lineage metadata (e.g., also referred to as "current column lineage metadata" herein) and existing column lineage metadata. The recent column lineage metadata can reflect the immediate relationship between one or more source columns and the target column (e.g., the set of transformations applied to the one or more source columns to generate the target column). For example, the recent column lineage metadata for a target column can describe one or more source columns and one or more database operations (e.g., relational operators or data manipulations within the context of a database system, examples of which include Select, Join, Union, Project, Product, Intersect, Difference, Divide, or their variants) used on the source columns to produce the respective target column. In comparison, the existing column lineage metadata can include the history of the transformation of the column throughout its life cycle before the most recent transformation.

In various implementations, the various types of column lineage metadata for a target column can include various pieces of information describing the column's lineage based on a particular format. For example, the current column lineage metadata can include a name or unique identifier of the target column and a name or unique identifier of the target dataset. If the target column was derived from one or more other source columns, the current column lineage metadata can include, for each of the source columns, the name or unique identifier of the source column(s) and the name or unique identifier of the source dataset(s). The current column lineage metadata can include information about the transformation(s)—such as a mapping, database operation (e.g., join, union, etc.), or function (e.g., average, divided by, etc.)—that was performed on the one or more source columns to generate the target column. If the target column was derived using transformation code, the current column lineage metadata can include the name or identifier of the transformation code that was used to derive the target column (e.g., usable to retrieve the transformation code from the pipeline data 250), or may even include the transformation code itself. The existing column lineage metadata can include similar information in the same formats, but instead reflect all the previous transformation steps (e.g., source column(s) used to derive a respective target column) in the data pipeline that were applied towards generating the target column.

The existing column lineage metadata associated with the one or more source columns may be retrieved from the column metadata 254 based on the names or identifiers of the one or more source columns. In various implementations, the column metadata manager 206 can combine or concatenate the current column lineage metadata with the existing column lineage metadata to form the complete column lineage metadata for a particular target column. The column metadata manager 206 can store the target column metadata (including the complete column lineage metadata) for a target column in the column metadata 254. The column metadata manager 206 may also associate the target column metadata with the particular target column of the target data set by, for example, storing the target column metadata with the target column directly within the target data set in the datasets 254, by associating the target column with a pointer to the corresponding target column metadata stored in column metadata 254, or by associating the target column metadata stored in column metadata 254 with a pointer to the corresponding target column and target data set in the datasets 252.

As a very specific example of column lineage metadata, a source data set A may include column X that is an initial column (e.g., raw data that has not undergone any pervious transformations). Transformation code J applied to data set A may result in transformation of column X of data set A into column Y of data set B, and target column metadata may be generated for target column Y of data set B. Since, column Y is the first transformation of the column X, existing column lineage metadata is not available and is not included in the target column metadata. However, the target column metadata would include current column lineage metadata, which in this case could indicate that column Y was derived from column X of data set A using transformation code J on date K, at time L, by person M. All the target column metadata for target column Y of data set B can be stored as column metadata 254 in the resource data storage 226, separately from the data set A and data set B which can be stored as part of datasets 252 within the resource data storage 226. The target column metadata for target column Y of data set B can be stored with a pointer to the appropriate version of data set B within datasets 252, or the data set B within datasets 252 can be stored with a pointer to the target column metadata for column Y, which can be stored as part of the column metadata 254 in the resource data storage 226. However, in various implementations, the target column metadata associated with target column Y may be stored within data set B as part of datasets 252. In various implementations, the transformation code J may also be stored within the pipeline data 250 and associated with a step in a data pipeline.

At a second point in time after data set B has been created, transformation code N can result in transformation of column Y of data set B into column Z of data set C. Target column metadata, in particular column lineage metadata, is generated for the target column Z. The complete column lineage metadata for target column Z can include current column lineage metadata (e.g., identifying the currently derived relationship between the source column Y and the target column Z), and the existing column lineage metadata of column Y. For instance, the current column lineage metadata can indicate that column Z was derived from column Y of data set B using transformation code N on date O, at time P, by person Q. The existing column lineage metadata of target column Z can be carried over from the complete column lineage metadata for column Y (e.g., column Y was derived from column X of data set A using transformation code J on date K, at time L, by person M), which can be retrieved (e.g., by the column metadata manager 206) from the column metadata for column Y stored within column metadata 254. The current column lineage metadata and the existing column lineage metadata of target column Z can be combined to form a complete column lineage (e.g., complete column lineage metadata) of the column Z.

It should be noted that this process of tracking and logging column provenance by building on the existing column lineage metadata of source column(s) can continue for the life cycle of column (e.g., over the course of a data pipeline), such that the complete column lineage metadata for a particular column can reflect the entire provenance associated with that particular column (e.g., the cumulative set of transformations applied to columns of raw data to arrive at that particular column).

So far the column lineage metadata has been described in terms of capturing the upstream provenance of a target column (e.g., the cumulative transformations applied throughout all of the earlier stages in a data pipeline resulting in the target column). However, in various embodiments, in addition to being able to trace the upstream provenance of a target column and log it within target column metadata during generation of the target column, the column metadata manager 206 may also be able to go back and determine the downstream lineage of a column and update the column lineage metadata for the column to additionally capture that downstream lineage. The column metadata manager 206 may determine the downstream lineage of columns periodically or at a set time (e.g., upon the completion of the entire data pipeline). For instance, after the generation of column Z, the next steps in the data pipeline in the previous example could be to use column Z as a source column for generating a target column Z1 in a data set and then use column Z1 as a source column for generating a target column Z2 in a data set. The initially-generated column lineage metadata for column Z may have been generated when column Z was generated, at a time that precedes the existence of columns Z1 and Z2. Thus, the column lineage metadata for column Z would initially only capture the upstream provenance of column Z and all the columns that column Z is dependent on, either directly or indirectly. However, the column metadata manager 206 could map out all the downstream columns that are directly or indirectly dependent on column Z by going through the column lineage metadata for all the columns associated with a data pipeline after the data pipeline has completed. For each column, the column metadata manager 206 could perform a search for all the complete column lineage metadata (or at the least, the current column lineage metadata) that includes that respective column's name or identifier as a source column. From those results, the column metadata manager 206 can map out the downstream lineage for that column and generate downstream column lineage metadata for that column, which can be included in the complete column lineage metadata for the column and saved in the column metadata 254. For instance, the current column lineage metadata for column Z1 would indicate that column Z was a source column that a transformation was applied to in order to generate target column Z1, and the current column lineage metadata for column Z2 would indicate that column Z1 was a source column used to generate target column Z2.

Notably, this information could be collectively saved as downstream column lineage metadata for column Z (and included as part of the complete column lineage metadata for column Z). Saving the downstream column lineage metadata for each target column in the data pipeline can be helpful later when generating a visual node graph for conveying all the dependency relationships associated with a selected column or data set (e.g., column Z). In particular, the complete column lineage metadata for the selected column could be efficiently referenced by the column metadata manager 206 to assist in generating the visual node graph since it would inform of the entire upstream/downstream lineage (e.g., the existence of columns Z1 and Z2), thereby removing the need to look at the column lineage metadata for other columns (e.g., target columns generated later in the data pipeline).

In some implementations, the column lineage of a target column can be represented as a graph the defines the relationships between the source column(s) and the target column, in which the nodes represent the columns, and the edges represent the derivation dependency (e.g., mapping, database operation, function) between the columns, such that if two nodes are connected by the edge, then the column referenced by the second node is a child of the column referenced by the first node, and the edge connecting the two nodes indicates the derivation dependency between the two columns. When the column lineage of the target column includes existing column lineage metadata of the source column(s), additional nodes and edges are included in the graph to represent ancestors of the source column(s) and their respective derivation dependencies. In some implementations, the graph representing the column lineage of the target column can be stored as column metadata 254. In some implementations, the graphs representing the column lineage of all the relevant columns (e.g., all the source and target columns across various data sets) in a data pipeline may be condensed into a single, complex graph, which can be stored as dependency relationships 260 and additionally managed by the dependency manager 210.

The access control manager 208 of the resource dependency system 220 may be configured for storing, managing, retrieving, and applying access control policies 256. The access control policies 256 may include access control policies for restricting access (e.g., read, write, copy, view, or access) to a resource or data set to persons or operations having adequate authority. The access control policies 256 may include column level access control policies for restricting access (e.g., read, write, copy, view, or access) to a column or the data therein to persons or operations having adequate authority. In some implementations, one or more source columns of a source dataset can be associated with one or more column level access control policies, and the column level access control policy associated with a source column can be stored or otherwise identified in source column metadata (e.g., in column metadata 254). Thus, in some cases, the column level access control policy can be a policy that is specific to a particular column(s) in a data set. For example, a first source column can have no associated column level access control policy while a second source column of the same source dataset has a restrictive column level access control policy. However, in other cases, the column level access control policy can be the same access control policy that is applied across the associated dataset.

The access control manager 208 may determine whether to propagate one or more access control policies in the data pipeline. For instance, the access control manager 208 may determine whether propagate column level access control policies to a respective target column, and propagate appropriate column level access control policies from the one or more source columns to a respective target column. In some embodiments, access control manager 208 may determine whether one or more source columns are associated with a column level access control policy, and upon determining that one or more source columns are associated with a column level access control policy, the access control manager 208 can propagate the access control policy to the target column of the target dataset. For example, the access control manager 208 can associate the column level access control policy with the target column by, for example, storing the column level access control policy with the target column metadata (e.g., in column metadata 254) or associating a pointer with the target column pointing to the respective one of the column level access control policies 256.

In some cases, in which a data transformation step uses two or more source columns, access control manager 208 may determine that at least two source columns are associated with respective level access control policies. Access control manager 208 can select one of these column level access control policies to propagate to the target column of the target dataset. For example, the access control manager 208 can propagate the most restrictive column level access control policy to the target column of the target dataset. In another example, column level access control manager 208 can use one or more rules to determine which of the multiple column level access control policies to propagate to the target column of the target dataset.

The access control manager 208 may also be configured to set, store, manage, retrieve, apply, and revise the permissions/access levels 258, which may specify the permissions/access levels granted to a user, in both generally-defined and/or resource-specific terms. For instance, a user may be associated with generally-defined permissions/access levels that specify the actions that the user is granted by default (e.g., the user is granted access to view, but not edit, all columns except columns that are associated with a highly restrictive column level access control policy). Thus, in this instance, the generally-defined permissions/access levels for the user will be applied against the column level access control policy of each column in order to determine the access level and corresponding actions the user is permitted to take with regards to that particular column. However, the permissions/access levels 258 may also include additional resource-specific permissions/access levels associated with a user. For instance, the permissions/access levels 258 may define resource-specific permissions/access levels specifying that the same user should not be granted access to column X in data set Y. Thus, the user's permissions or access levels could be first determined based on any defined resource-specific permissions/access levels, followed by application of the generally-defined permissions/access levels granted to the user. The access control manager 208 may be configured to allow a user's permissions/access levels to be edited. For instance, via a user interface, a request can be sent to the access control manager 208 to modify a user's resource-specific permissions/access levels to allow a certain kind of access to one or more resources, and the access control manager 208 may ultimately modify the permissions/access levels 258 to enable that access.

The dependency manager 210 may be configured to determine, store, and retrieve dependency relationships between resources (e.g., source columns of source dataset(s) and target columns of target data set(s)). The dependency relationships can be stored within the dependency relationships 260 of the resource data storage 226. Details for a dependency relationship may include the source data set(s), the source columns in the source data set(s), the target data set(s), one or more target columns of the target data set(s), and the nature of the dependency relationship between the source columns of the source data set(s) and the target columns of the target data set(s). Some examples of dependency relationships may include data set or column provenance/lineage, but could also include the propagation of one or more access control policies between columns or data sets in the data pipeline, and the propagation of permissions/access levels for a user between columns or data sets in the data pipeline. Some of the dependency information may be stored elsewhere in the resource data storage 226 and can be used by the dependency manager 210 to derive the dependency relationships and store them in a desirable format.

For instance, dependency manager 210 may be able to operate in conjunction with the column metadata manager 206 in order to retrieve column provenance/lineage from the column metadata 254 that can be used to generate a graph representing the column lineage of all the relevant columns (e.g., a node in the graph may represent a column and a directed edge between two nodes may indicate the column lineage between the two columns represented by those two nodes) for a data pipeline. The graph representing the column lineage for a data pipeline can be stored, along with the graphs associated with other data pipelines, as dependency relationships 260.

The dependency manager 210 may also be able to operate in conjunction with the access control manager 208 in order to determine the propagation of access control policies or permission/access levels from the access control policies 256 and permissions/access levels 258. This information can be used to inform a user (e.g., via the user interface) of the permissions/access levels granted to them for accessing columns and data sets in the data pipeline, how those permissions/access levels may be propagated between the columns and data sets, and how the user may be able to obtain access to a selected column or data set based on the permissions/access levels granted to the user for upstream columns or data sets. In some cases, a graph representing the propagation of access control policies or permissions/access levels between the columns or data sets of a data pipeline can be stored under dependency relationships 260.

The resource grouping module 212 of the resource dependency system 220 may be configured to specify, manage, and apply various grouping schemes for classifying the resources of a data pipeline based on properties or attributes associated with those resources (and thus, also classify the nodes representing those resources in a visual node graph rendered through the user interface module 202). The classification of resources (and their associated nodes) based on a grouping scheme is further shown and described in FIGS. 5A, 5B, 6A-6C, 7A, and 7B.

Example User Interfaces and Processes for Displaying Resource Dependencies (e.g., Column Lineage Provenance)

FIGS. 3A and 3B illustrate example user interfaces associated with displaying resource dependencies, according to various embodiments of the present disclosure. More specifically, FIGS. 3A and 3B illustrate example user interfaces that depict data set and column provenance (e.g., the lineage of data sets with column level granularity).

Resource dependencies such as provenance or lineage can be tracked on the basis of recording data transformations applied to resources (e.g., data sets) at each step of a data pipeline. In addition to tracking provenance of data sets, the provenance or lineage can be tracked at a column level granularity (e.g., provenance or lineage for individual columns of the data sets) over the span of the data pipeline on the basis of recording data transformations applied to the individual columns of the data sets over the span of the data pipeline. The provenance or lineage associated with a particular target column of a target data set generated at a point in the data pipeline may have be recorded and stored as column lineage metadata, such as in column metadata 254. Alternatively, the provenance or lineage associated with all the relevant columns and data sets in the data pipeline may be stored in a graph data structure in the dependency relationships 260 (e.g., in FIG. 2). These resource dependencies can be retrieved by the resource dependency system and used to generate a visual node graph displayed in a user interface.

In general, a visual node graph may display representations of resources as nodes and the dependency relationships between those resources as lines, arrows, or edges between the corresponding nodes. The representations for resources in the visual node graph may be referred to either as nodes or resource representations. In the latter case, more specific terminology can be used based on the different kinds of resources that may be represented, examples of which include data sets (e.g., data set representations), and so forth. A user may be able to use a user interface to drill into any particular node of the visual node graph and select any particular column(s) of data within the represented data set. In some implementations, the user interface may present a list of columns to the user and the user may be able to select a column from the list. The system may access the provenance/lineage (e.g., upstream provenance and downstream lineage) of the selected column(s) of data and generate a user interface displaying an updated visual node graph that includes representations of the selected node, the selected column(s) within that node, and edges connecting the selected column(s) with other columns in other data sets that the selected column(s) depend on (e.g., upstream provenance) or depend on the selected column(s) (e.g., downstream lineage). The user interface may also include features for informing the user of the data transformations applied to columns (e.g., one or more source columns, to generate a target column) at each step of the data pipeline. Column provenance/lineage for the visual node graph may be determined through the generation, storage, and retrieval of column lineage metadata for the selected column(s), or from a graph data structure that records the provenance of columns throughout a data pipeline, as described in regards to FIGS. 1 and 2.

For instance, FIGS. 3A and 3B illustrate an example user interface 300 for a resource dependency system (e.g., such as resource dependency system 120) that includes a visual node graph 310 for depicting the provenance of columns across related data sets based on available provenance tracking information. The provenance of the data sets themselves (e.g., the higher level dependencies among the related data sets) can be inferred from the visual node graph 310, and in various implementations, there may also be an option (e.g., a selectable button) to display a visual node graph in a way that depicts the provenance of related data sets at the data set level without the column level granularity.

The visual node graph 310 may include a representation for each of the related data sets, which may be collectively referred to as data set representations. For instance, data sets may be represented by an icon or a shape, such as a rectangle, square, circle, and so forth. Each data set may be represented by the same or similar icons or shapes, or the data sets may be represented by differing icons or shapes based on a pre-defined scheme (e.g., a representation of a first shape may be associated with a first type of data set, a representation of a second shape may be associated with a second type of data set, and so forth). Additionally, the data set representations may also be shaded and/or colored based on a pre-defined scheme (e.g., a representation of a first color may be associated with a first type of data set, a representation of a second color may be associated with a second type of data set, and so forth). Having more uniformity among the data set representations (e.g., similar shapes, color, shading) may be useful for reducing visual clutter and make for a more-interpretable visual node graph 310 when the predominant priority is to visually convey the dependency relationships, whereas more complex schemes for the data set representations may be useful for conveying more information through the visual node graph 310 when the dependency relationships are not the only priority.

The visual node graph 310 may include a representation for each of the relevant columns in the illustrated data sets (e.g., the columns which are being transformed and modified across the various data sets), which may be collectively referred to as nodes or column representations. For instance, a column may be represented by an icon or a shape, such as a rectangle, square, circle, and so forth. Each column may be represented by the same or similar icons or shapes, or the columns may be represented by differing icons or shapes based on a pre-defined scheme (e.g., a representation of a first shape may be associated with a first type of column, a representation of a second shape may be associated with a second type of column, and so forth). Additionally, the column representations may also be shaded and/or colored based on a pre-defined scheme (e.g., a representation of a first color may be associated with a first type of column, a representation of a second color may be associated with a second type of column, and so forth). Having more uniformity among the column representations (e.g., similar shapes, color, shading) may be useful for reducing visual clutter and make for a more-interpretable visual node graph 310 when the predominant priority is to visually convey the dependency relationships, whereas more complex schemes for the column representations may be useful for conveying more information through the visual node graph 310 when the dependency relationships are not the only priority.

The icons, shapes, colors, and shadings for the column representations may be similar to the ones for the data set representations, and in some cases, the same schemes may be implemented for both the column representations and the data set representations (e.g., a first color is associated with a first type that is applicable to either a data set or a column, and so forth). Alternatively, the icons, shapes, colors, and shadings for the column representations may be very different from the ones selected for the data set representations. Having more uniformity between the column representations and data set representations may be useful for reducing visual clutter and make for a more-interpretable visual node graph 310 when the predominant priority is to visually convey the dependency relationships, whereas using different schemes between the column representations and data set representations may be useful in instances where it is more desirable to visually conveying more information (e.g., about variations in columns and data sets) through the visual node graph 310 and the dependency relationships are not the only priority.

In the visual node graph 310, the representations for the columns may be partially or completely within the corresponding representations for the data sets that they belong to, in order to visually indicate which data set each column belongs to. The visual node graph 310 may include lines, arrows, or edges between column representations or data set representations in order to indicate a dependency relationship. Arrows or directed edges may be used to indicate a direction of a relationship (e.g., which of two columns depends on the other). The representations on the visual node graph 310 may also be organized in a manner that facilitates the ease of a user interpreting and understanding the dependency relationships shown. For instance, if possible, the visual node graph 310 may have a directional scheme or aspect to it and representations may be arranged such that all the arrows or edges indicating directional dependencies are all heading towards the same general direction (e.g., the left side or the right side). As a more specific example, the visual node graph 310 may be organized so that "downstream" is associated with the rightward direction of the visual node graph 310. Each progressive modification or transformation of a data set or column may be more and more "downstream" and represented further in the rightward direction of the visual node graph 310, and all the arrows or edges may be in the rightward direction in accordance with this directional scheme. Thus, if column C is directly dependent on column B (e.g., directly "downstream" of column B), which is in turn directly dependent on column A, the representations of the three columns would be arranged left-to-right in the order of column A, then column B, then column C—with a rightward arrow or edge between column A and column B, as well as column B and column C. Thus, representations of dependent columns or data sets of a selected column may be arranged on a first side of the selected column, while representations of columns or data sets that the selected column is dependent on may be arranged on a second side of the selected column.

In various implementations, the visual node graph 310 may be generated based on a selection of one or more column(s) of interest within one or more data sets. For instance, a user may select a particular column within a data set, and the resource dependency system may be configured to determine the columns of other data sets that are directly dependent on that column, the columns directly dependent on those columns, and so forth. The resource dependency system may also determine the provenance of the selected column by determining the column(s) that the selected column directly depends on, the columns that those column(s) directly depend on, and so forth. These dependency relationships may be mapped out and used to generate the visual node graph 310. In some cases, the provenance associated with the selected column may have already been mapped out and stored as a graph or graph-like data structure, in which case, the visual node graph 310 may essentially be a visual presentation of that data structure.

The visual node graph 310 in the specific example shown in FIG. 3A displays representations of six related data sets (including "Dataset-1", "Dataset-2", "Dataset-3", "Dataset-4", "Dataset-5", and "Dataset-6"), with the data set representations being rectangles. The visual node graph 310 also displays representations of the relevant columns that are wholly within the representation of the data set they correspond to, with the column representations being rectangles. The data set representations and column representations are all labeled. Thus, for instance, it can be quickly determined from looking at the left of the visual node graph 310 that the columns "User_id" and "Vendor_id" are columns within the "Dataset-1" data set.

The nodes or representations may be arranged within the visual node graph 310 based on a directional scheme that flows from left to right, such that the arrows and edges connecting the representations are in the rightward direction. For instance, five rightward arrows come out of the "User_id" column representation of "Dataset-1", which indicates that the "User_id" column in "Dataset-1" is part of the origin of five other columns in other datasets that directly depend on it. As a more specific example, a rightward arrow connects the representation for the "User_id" column in "Dataset-1" to the representation for the "User_id" column in "Dataset-2", which is located on the right. This arrangement of the visual node graph 310 quickly conveys to a user that the "User_id" column in "Dataset-2" is dependent on the "User_id" column in "Dataset-1".

The visual node graph 310 in the specific example shown in FIG. 3A may have been generated as a result of a user selection of one or more column(s) of interest within one or more data sets. For instance, a user may select a particular column within a data set, and the resource dependency system may be configured to determine the provenance of the selected column, including columns of other data sets that are directly dependent on that column, the columns directly dependent on those columns, and so forth. These dependency relationships may be mapped out and used to generate the visual node graph 310. In some cases, the provenance associated with the selected column may have already been mapped out and stored as a graph or graph-like data structure, in which case, the visual node graph 310 may essentially be a visual presentation of that data structure. For instance, the visual node graph 310 may have been generated based on a user selection to display the provenance of the "User_id" and "Vendor_id" columns within "Dataset-1". Based on the selected columns, the resource dependency system may determine all the columns (e.g., in other data sets or the same data set) that are dependent, either directly or indirectly, on the selected columns, as well as all the columns (e.g., in other data sets or the same data set) that the selected columns are dependent on, either directly or indirectly. The resource dependency system may determine all of this information based on available column lineage metadata or a graph/graph-like data structure recording the resource dependencies, which may be accessible within a resource data storage (e.g., resource data storage 126 in FIG. 1).

If there are no columns within "Dataset-1" that are dependent on the selected columns, then the generated visual node graph 310 will only indicate columns in other data sets that are dependent on those two selected columns. The generated visual node graph 310 may also show representations for the columns in data sets that the selected columns are dependent on, such as to the left of the representation of "Dataset-1". However, in this specific example, there are no representations shown to the left of the representation for "Dataset-1" which implies those columns do not exist. One instance in which this scenario would occur is if the two selected columns contain raw data (e.g., data that has not had transformations applied to it) and have no upstream dependencies.

Selecting one of the representations in the visual node graph 310 may result in additional information being presented about the selection. For instance, FIG. 3B illustrates the user interface 300 displaying an additional information pane 320 that can be displayed to view information associated with a selection made in the visual node graph 310. In the specific example of FIG. 3B, selecting the representation for the "User_id" column in "Dataset-1" provides additional details about that column in the information pane 320. These details may include the name of the column, a description about the column (in some cases, the description for the column may be retrieved from metadata associated with the column), the data set that the column belongs to, the date and time that data set was created, any typeclasses for that data set, statistics associated with the column (e.g., percentage of unique values), information about any input or "source" columns that the selected column may depend on, and so forth. The panel 320 may also include additional navigation tools, such as options to enable functions such as search, sorting, filtering, and sharing options. Also, the panel 320 may also allow for saving or pinning various user interface configurations to be used later or sharing those configurations with a group or particular user.

Furthermore, the user interface 300 may have one or more selectable tabs, such as selectable tab 330. In this instance, the selectable tab 330 is labeled "Dataset code" and selecting the selectable tab 330 may open an additional information panel displaying code associated with the data set. The code may describe the transformations or functions (e.g., applied to one or more source columns) used to generate a target column, such as the various columns of a selected data set or a particular selected column. In some implementations, the user interface and the associated resource dependency system may be able to display the cumulative transformation code associated with generating the target column. In other words, instead of the code only describing a single step of transformations applied to one or more source columns that were directly used to generate the target column, the code may describe all the collective transformations applied to upstream columns (e.g., source columns) in the data pipeline over time that results in the generation of the target column.

Although the resources listed and represented in the visual node graph 310 can be exhaustive of all the provenance/lineage resource dependencies associated with a selected resource, in some cases, the resources listed and represented in the visual node graph 310 may not be exhaustive for a selected resource and there can be additional resource dependencies not depicted (e.g., either not on the screen due to screen size restraints, due to user settings/preferences/restrictions, due to system limitations, etc.). For instance, the visual node graph may only present nodes upstream to the selected node that are up to two nodes away in the chain of dependency.

In some implementations (not shown), the user interface 300 can also include a toolbar that provides users the ability to modify or change the directional scheme of the visual node graph 310 (e.g., from top-to-bottom instead of left-to-right), the ability to modify one or more data sets by moving the data set representations around, the ability to change dependency relationships by moving the arrows or drawing in new arrows, the selection of particular nodes (e.g. data set or column representations) in the visual node graph 310, the ability to search through the data sets and the data within each data set based on keywords or more advanced searching features, and so forth.

Figure 4:
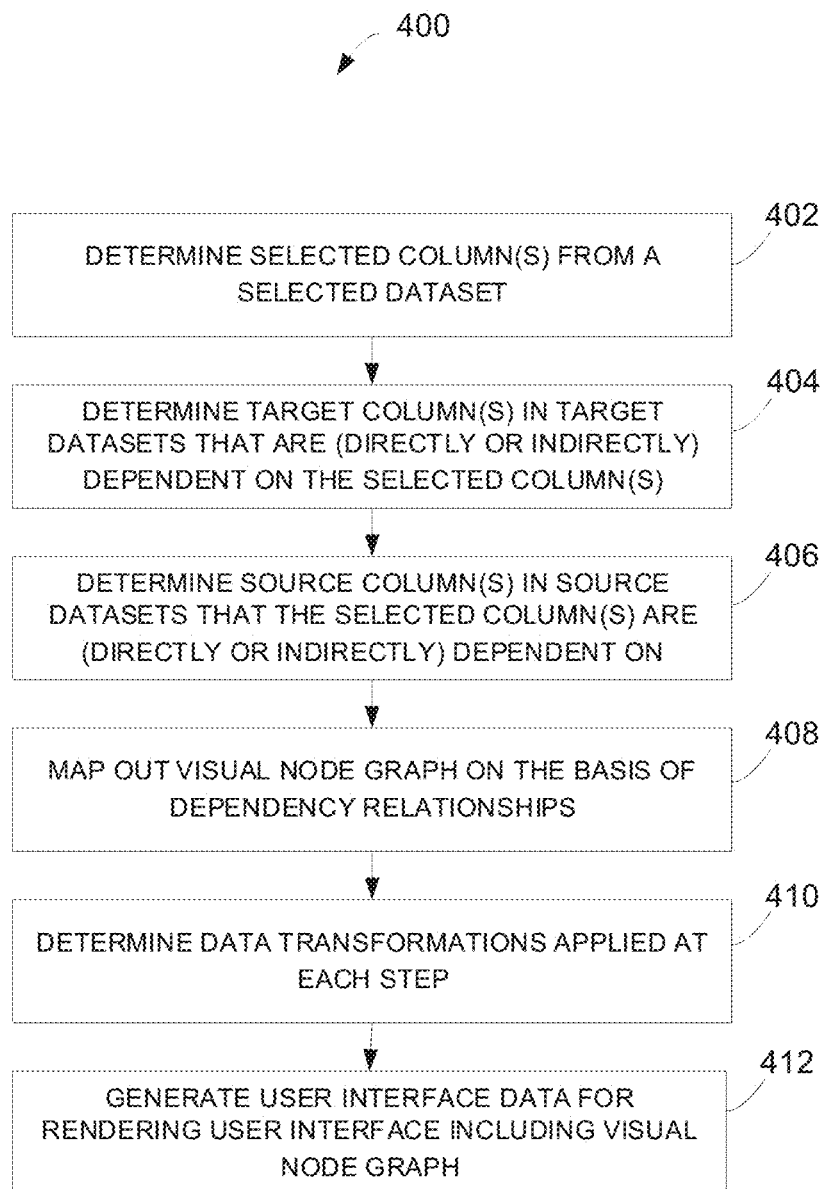
FIG. 4 is a flow chart that illustrates functionality of a resource dependency system related to determining column provenance/lineage and generating a visual node graph based on the column provenance/lineage, according to various embodiments of the present disclosure.

FIG. 4 illustrates a flow chart 400 illustrating functionality of a resource dependency system related to determining column provenance/lineage (e.g., for a selected column) and generating a visual node graph based on the column provenance/lineage, according to various embodiments of the present disclosure. The steps and/or blocks of FIG. 4 should be interpreted to be acceptable in any particular order, except where the system or method would not function for its intended purpose. One or more of the blocks described may be optional in certain implementations.

At block 402, the resource dependency system may determine selected column(s) from a selected dataset. For instance, a user may make a selection in the user interface of their user device, such as to request that a visual node graph be generated for a date pipeline or group of resources (e.g., resources related or dependent on the selected column(s) from a selected dataset). As a specific example, the user interface may enable a user to select a specific resource or data set, access a list of columns present in that data set, select a particular column from that list, and then select an option to cause display of a visual node graph providing a column-based dependency view. From the selected column(s), the resource dependency system will determine one or more target columns in other data sets that are dependent on the selected column(s) (e.g., generated by applying transformations to the selected column(s)) and source columns from other data sets from which the selected column(s) depend (e.g., on which transformations were applied to generate the selected column(s)).

At block 404, the resource dependency system may determine target column(s) in target data sets that are dependent (either directly or indirectly) on the selected column(s). For instance, the resource dependency system may determine target column(s) in data sets that are directly dependent on the selected column(s) by searching the column lineage metadata of all the columns in data sets to identify columns for which their current column lineage metadata identifies the selected column(s) as a source column that a set of transformations were applied to. In turn, these target column(s) may serve as the source columns for generating additional target column(s) in data sets later in the data pipeline, and those latter target column(s) are thus indirectly dependent on the initially selected column(s). Any indirectly dependent target column(s) can be identified iteratively by continuing to search the column lineage metadata to identify columns for which their current column lineage metadata identifies any of the previously-identified target column(s) as a source column. Alternatively, they may be identified by identifying all the columns for which their complete column lineage metadata indicates the selected column(s) served as a source column in any of the data transformation steps cumulatively used to generate that column. It should be noted that, in some implementations, the column lineage metadata for the selected column(s) may already include downstream column lineage that indicates all of the target column(s) in target data sets directly or indirectly dependent on the selected column(s), or there may already be one or more saved graphs that represent the complete column provenance and lineage of the selected column(s), which would be represented as nodes in those graphs. Thus, the determination of target column(s) can be quickly made in those instances. Additional details regarding how target column(s) can be determined is described in regards to FIGS. 1 and 2.

At block 406, the resource dependency system may determine source column(s) in source data sets that the selected column(s) are dependent on (either directly or indirectly). The complete column lineage metadata for the selected column(s) may already include column provenance information indicating all of the source column(s) in cumulative data transformation steps applied to generate the selected column(s). Source column(s) that the selected column(s) are directly dependent on would be the source column(s) on which the most-recent set of transformations were applied to in order to generate the selected column(s). Source column(s) that the selected column(s) are indirectly dependent on would be the source column(s) further away in the chain of dependency, such as all the sources of data utilized prior to the most-recent set of transformations. In some implementations, there may already be one or more saved graphs that represent the complete column provenance and lineage of the selected column(s), which would be represented as nodes in those graphs. Thus, the determination of any source column(s) can be quickly made in those instances.

At block 408, the resource dependency system may map out a visual node graph on the basis of the dependency relationships that were determined at blocks 404 and 406. In some cases, a corresponding graph could be referenced, built, or updated that maps out the column provenance/lineage relationships. For instance, all the various columns (e.g., selected columns, target columns, and source columns) may be represented as nodes in the graph and edges connecting any two nodes may correspond to a direct column provenance/lineage relationship between the two columns represented by those nodes. This graph may serve as the basis for the visual node graph that is presented to the user.

At block 410, the resource dependency system may optionally determine the data transformations applied at each step in the visual node graph (or in the corresponding graph or data pipeline). For example, the resource dependency system may retrieve the transformation code that was applied to generate each of the nodes (e.g., columns) in the graph. In some cases, this information can be retrieved directly if the column lineage metadata for the columns already contain the transformation code. Otherwise, the column lineage metadata may indicate the transformation code, which can be retrieved elsewhere (e.g., from pipeline data). In some cases, all the transformation code may have already been retrieved at the same time that the determination of target and source columns was made. In addition to the data transformations applied at each step, the resource dependency system may know the cumulative data transformations that have been applied up to each step, either by combining the data transformations of all the previous steps or by referencing the complete column lineage metadata for the target column in that step.

Additionally, at block 410, the resource dependency system may retrieve available column metadata (more comprehensive than column lineage metadata) for each represented column or node, in case the user wishes to review the column metadata associated with that particular step in the data pipeline. The resource dependency system may be able to present this column metadata to the user via the user interface. For instance, a user may be able to select a node representing a column in the visual node graph, and the user interface may be able to display column metadata associated with that particular column, column metadata for a target column dependent on that particular column, and so forth At block 412, the resource dependency system may generate user interface data for rendering a user interface that includes the visual node graph (e.g., such as the visual node graphs shown in FIGS. 3A and 3B) and present it to the user. The visual node graph may include nodes or representations of the various columns (e.g., the selected column(s), any target columns directly or indirectly dependent on the selected column(s), any source columns from which the selected column(s) are directly or indirectly dependent on, and so forth) and arrows or edges (directed or undirected) between two nodes that indicate the dependency relationship between the two columns they represent. There may also be representations of the data sets to which the various columns belong to. In some cases, the node or representation for each column may be located or appear partially or completely within the corresponding representation of the data set that the respective column is from, so that the user can also understand the data set level dependencies from the column level dependencies. This user interface may allow the user to select on specific nodes to view the transformation code applied in generating the corresponding column at that step, or all the cumulative data transformations that have been applied up to that step.

Example User Interfaces and Processes for Displaying Resource Groupings

Figure 5A:
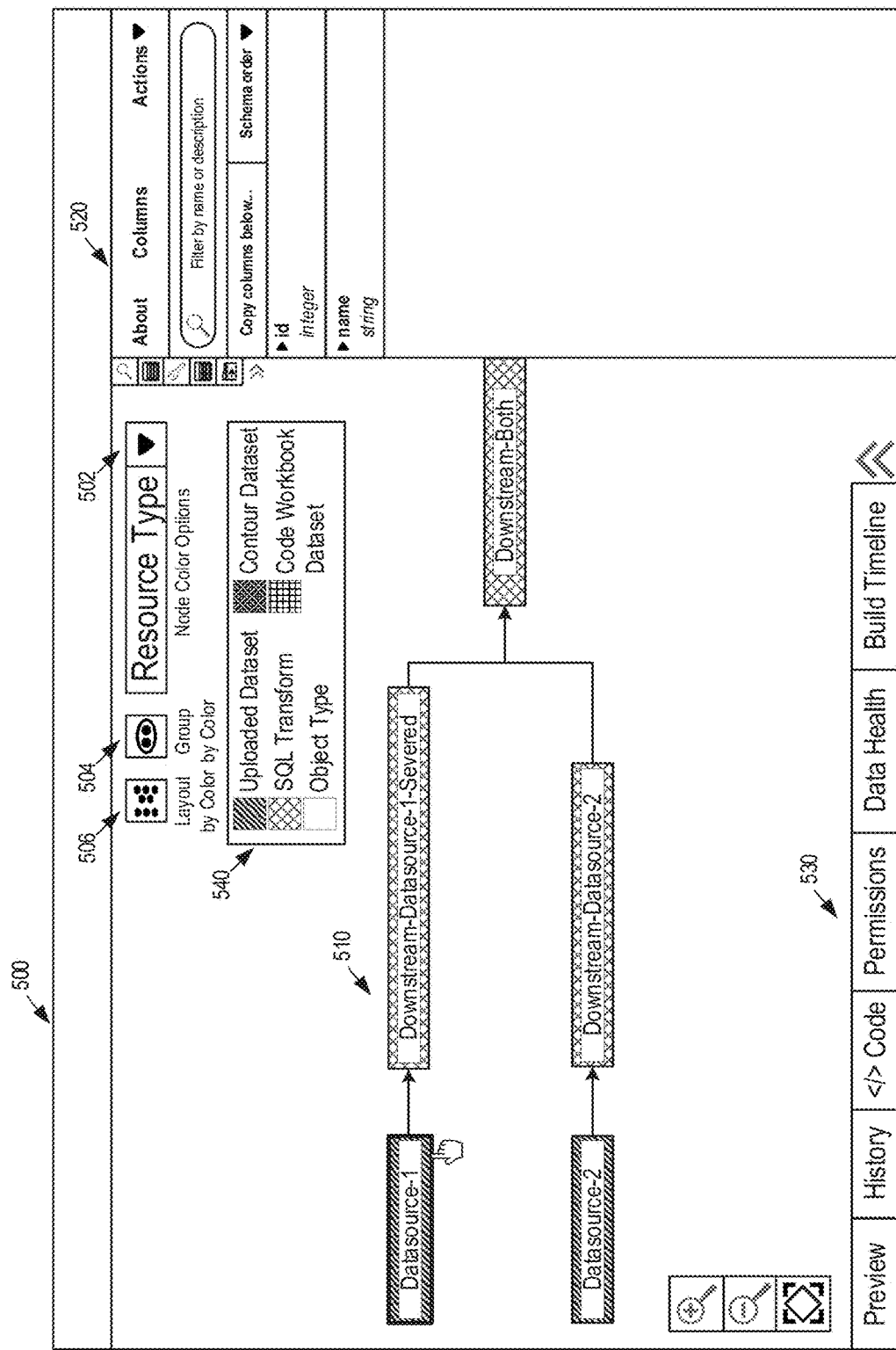
FIGS. 5A and 5B illustrate example user interfaces that allow resources represented in a visual node graph to be grouped and displayed based on various schemes, according to various embodiments of the present disclosure.
Figure 5B:
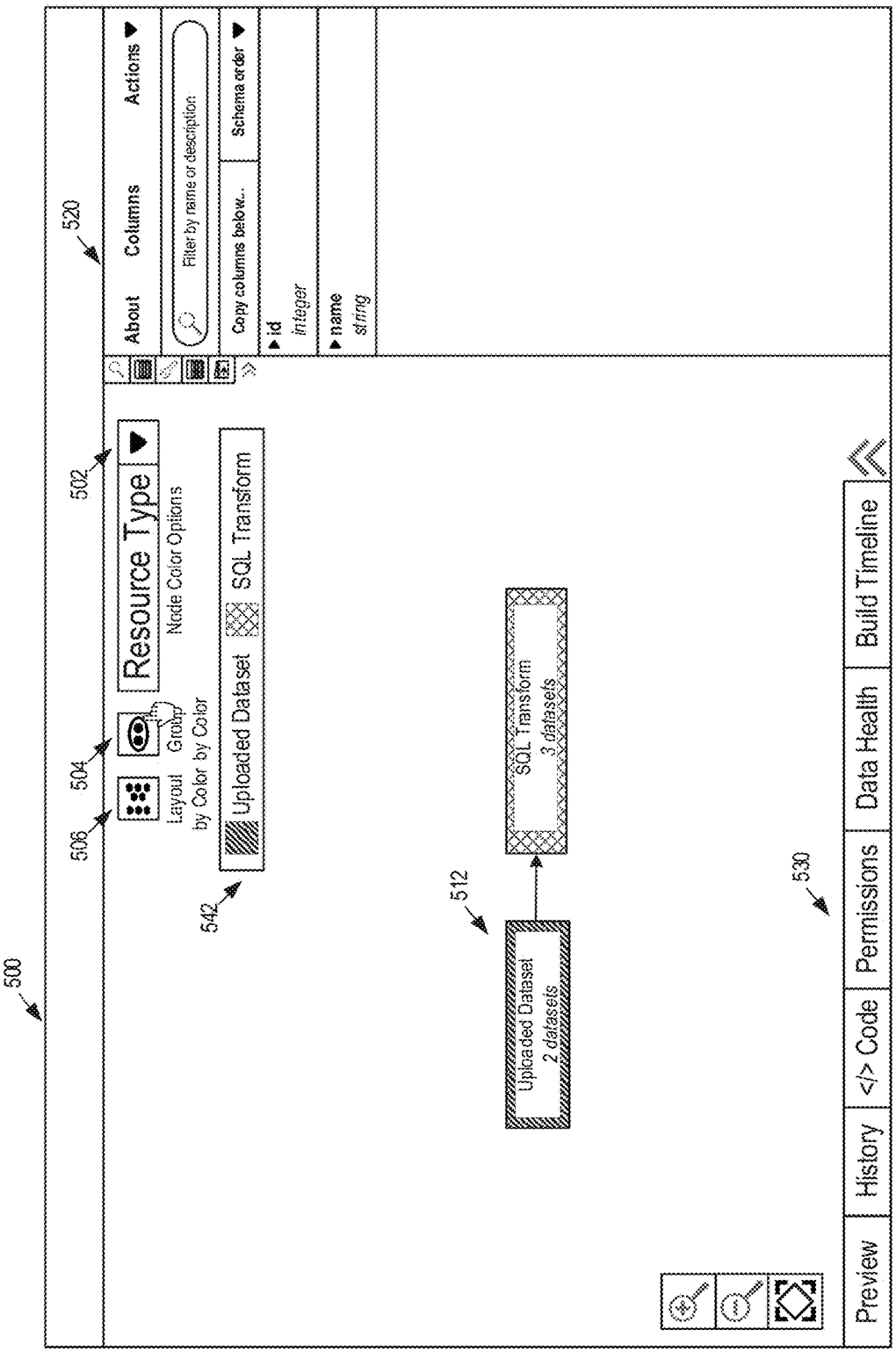

FIGS. 5A and 5B illustrate example user interfaces associated with displaying resource groupings, according to various embodiments of the present disclosure. More specifically, FIGS. 5A and 5B illustrate example user interfaces that allow resources represented in a visual node graph to be grouped and displayed based on various schemes. FIGS. 5A and 5B are discussed together.

FIGS. 5A and 5B illustrate an example user interface 500 (e.g., for a resource dependency system, such as resource dependency system 120) that includes a visual node graph (e.g., visual node graph 510 in FIG. 5A and visual node graph 510 in FIG. 5B). The visual node graph that can be used to display representations of resources (e.g., data sets associated with various stages of a data pipeline) and the dependencies between those resources (e.g., data set provenance/lineage, the transitivity of access control policies or permissions based on provenance, and so forth). The visual node graph may display representations of resources as nodes and the dependency relationships between those resources as lines, arrows, or edges between the corresponding nodes. The representations for resources in the visual node graph may be referred to either as nodes or resource representations. In the latter case, more specific terminology can be used based on the different kinds of resources that may be represented, examples of which include data sets (e.g., data set representations), and so forth. In some implementations, the user interface may have the feature of adding additional resources or data sets for representation by the visual node graph, such as all the data sets in a particular project. In some implementations, there may be an option in the user interface that the user may select to add representations for all the data sets associated with a particular project to the visual node graph.

However, the nodes in the visual node graph may be displayed differently based on various selectable criteria and configurations. In particular, different types of nodes may be displayed different to convey to the user the different types of nodes, with the type of each node being determined from properties or attributes associated with the resource represented by that node. The specific properties or attributes for classifying nodes may be based on various selectable criteria and configurations, including relationship a resource has with a project, user permissions associated with that resource, as well as optional filters for various parameters (e.g., file size) or categories associated with the displayed nodes in the visual node graph. Furthermore, the user interface may include selectable options for updating the visual node graph to display, layout, or group the nodes according to their differences (e.g the relevant differences between the resources they represent), and further present, via the user interface, the properties and dependencies associated with selected or grouped nodes.

There can be many ways in which the nodes are displayed differently in the visual node graph. For instance, nodes may be represented by an icon or a shape, such as a rectangle, square, circle, and so forth. Each node may be represented by the same or similar icons or shapes, or the node may be represented by differing icons or shapes based on a pre-defined scheme (e.g., a representation of a first shape may be associated with a first type of resource, a representation of a second shape may be associated with a second type of resource, and so forth). Additionally, the nodes may also be shaded and/or colored based on a pre-defined scheme (e.g., a representation of a first color may be associated with a first type of resource, a representation of a second color may be associated with a second type of resource, and so forth). All of these variations among how the nodes are displayed may be collectively defined as part of a display scheme. For instance, the display scheme may define various display configurations for nodes of different types (e.g., representations of a first variation for a first type, representations of a second variation for a second type, and so forth). In some cases, the display scheme may define variations among the resource representations based on a singular dimension, such as shape (e.g., a shape scheme), coloration (e.g., a coloration scheme), shading (e.g., a shading scheme), and so forth. Having more uniformity among the nodes (e.g., similar shapes, color, shading) may be useful for reducing visual clutter and make for a more-interpretable visual node graph when the predominant priority is to visually convey the relationships between nodes, whereas more complex display schemes for the nodes may be useful for conveying more information through the visual node graph when the relationships between nodes are not the only priority.

In addition to a display scheme, there may be a grouping scheme for classifying the nodes into different types for applying the display scheme. In some cases, the grouping scheme may be based on properties or attributes associated with the corresponding resources represented by the nodes, based on a selection of nodes, or based on a selection of resources that correspond to nodes in the visual node graph. Some examples of grouping schemes based on properties or attributes associated with the corresponding resources represented by the nodes involve grouping nodes based on "project", "resource type", "permissions", and so forth. In some implementations, the grouping scheme may be user-selectable and there may be a user interface element for selecting the desired grouping scheme.

Thus, the visual node graph may be generated as a result of both a display scheme and a grouping scheme. More specifically, the visual node graph may be created by first classifying relevant resources into various types based on a grouping scheme, and then generating nodes for the visual node graph that are differentiated for those types based on the display scheme. For instance, a grouping scheme based on "project" type may classify a first set of resources associated with a first project as a first type and a second set of resources associated with a second project as a second type. The display scheme may dictate that a first type is represented by nodes of a first color, while a second type is represented by nodes of a second color. Thus, the resulting visual node graph may include nodes of a first color representing the resources associated with the first project and nodes of a second color representing the resources associated with the second project. A user interface displaying a visual node graph may include a legend that explains the display scheme and the grouping scheme for the nodes, which the user can reference to quickly interpret the visual node graph.

In various implementations, there may be a user-selectable option to visually arrange the layout of the nodes of the visual node graph based on the selected grouping scheme (e.g., arranging the layout of nodes based on properties or attributes associated with the corresponding resources represented by the nodes) and display scheme. More specifically, nodes may be visually arranged into clusters based on the various types of nodes specified by the grouping scheme. This visual arrangement may be less efficient for understanding the different stages of a data pipeline, but it may be effective for quickly providing an understanding of the relationships between node clusters of different types (and the resources they represent). For instance, it may be quickly determined that a second type of node is largely dependent on a first type of node, but not the other way around. This feature is shown and described in additional detail in FIG. 6A and its corresponding paragraphs.

In various implementations, there may be a user-selectable option to group the nodes of the visual node graph based on the selected grouping scheme (e.g., arranging the layout of nodes based on properties or attributes associated with the corresponding resources represented by the nodes) and display scheme. More specifically, the nodes of each type (e.g., as defined by the grouping scheme) may be collectively replaced by a singular node in the visual node graph. Each replacement node may inherit the dependency relationships from the nodes that it replaced, but the representations of those relationships (e.g., lines, arrows, edges, and so forth) may be combined and simplified as a result of the grouping. For instance, if a node of a second type is dependent on a node of a first type, then after the node grouping is performed, there may be an edge or arrow from the replacement node for the first type to the replacement node for the second type that serves to indicate the existence of that constituent relationship.

In the specific example shown in FIG. 5A, the example user interface 500 includes a visual node graph 510 shows five nodes representing various resources and a dependency among those nodes, which can be typical of a data processing pipeline. The user interface 500 may include a drop-down menu 502 that enables a user to select among a list of pre-defined grouping schemes to use with a display scheme. In this instance, the display scheme may be a coloration scheme, such that nodes in the visual node graph are displayed as different colors based on their type (e.g., properties associated with their corresponding resource). The drop-down menu 502, which is labeled "Node Color Options", may include selections of grouping schemes such as "project", "resource type", and "permissions" for classifying, coloring, and displaying nodes of different types. In this example, selecting the "resource type" option may classify and color each node based on the type of resource that the node is representing. For instance, as shown in the legend 540, resources having the types of "Uploaded Dataset", "SQL Transform", "Object Type", "Contour Dataset", and "Code Workbook Dataset" may be represented by nodes in the visual node graph 510. Each node in the visual node graph 510 may have a color, as indicated by the legend 540, that corresponds to the type of the resource that node is representing.

The user interface 500 may further include a button 504 for grouping and displaying the nodes in the visual node graph 510 based on the selected grouping scheme and display scheme. Since the display scheme is a coloration scheme in this instance, the button 504 is labeled "Group by Color" because, from the user's perspective, selection of the button 504 may appear to result in the visual node graph 510 being updated to group together any nodes of the same color. Since "resource type" is selected as the grouping scheme in the drop-down menu 502 labeled "Node Color Options", nodes are classified based on the resource type of the resource they represent, and choosing to group together nodes of the same color will result in nodes associated with resources of the same type being grouped together into a superseding node.

For instance, selecting the button 504 may result in the updated visual node graph 512 shown in FIG. 5B, which is best understood by comparison to the visual node graph 510 of FIG. 5A. In the visual node graph 510, the nodes labeled "Datasource-1" and "Datasource-2" are of a first color and represent resources having a resource type of "Uploaded Dataset", whereas the nodes labeled "Downstream-Datasource-1-Severed", "Downstream-Datasource-2", and "Downstream-Both" are of a second color and represent resources having a resource type of "SQL Transform". Thus, selecting button 504 to group the nodes may result in "Datasource-1" and "Datasource-2" being grouped together and visually replaced by a single superseding node of the first color corresponding to the resource type of "Uploaded Dataset", while "Downstream-Datasource-1-Severed", "Downstream-Datasource-2", and "Downstream-Both" are grouped by a single superseding node of the second color corresponding to the resource type of "SQL Transform." Thus, the resulting visual node graph 512 in FIG. 5B shows the nodes from the visual node graph 510 condensed into two nodes: a node of the first color representing two datasets and corresponding to the resource type of "Uploaded Dataset" and a node of the second color representing three datasets and corresponding to the resource type of "SQL Transform". An updated legend 542 may facilitate interpretation of the updated visual node graph 512. In this specific instance, the number of different resource types has been condensed into a total of two types.

The user interface 500 may further include a button 506 for visually re-arranging the layout of nodes within the visual node graph 510 based on the selected grouping scheme (e.g., arranging the layout of nodes based on properties or attributes associated with the corresponding resources represented by the nodes) and display scheme. Since the display scheme is a coloration scheme in this instance, the button 506 is labeled "Layout by Color" because, from the user's perspective, selection of the button 506 may appear to result in the visual node graph 510 being updated to arrange nodes in clusters of the same color. Since "resource type" is selected as grouping scheme in the drop-down menu 502 labeled "Node Color Options", choosing to layout nodes by color will result in any nodes associated with resources of the same type being arranged into a cluster. This feature of visually arranging the nodes of the visual node graph based on the grouping and display scheme is shown and discussed in more detail in FIG. 6A.

In various implementations, the user interface 500 may include an information panel 520 that may provide additional information about selected nodes in the visual node graph, the columns in the resources (e.g., data sets) associated with those nodes, and so forth. The information panel 520 may also include input fields to search or filter the nodes or resources by name or description. The information panel 520 may also be hideable to prevent it from obstructing the view of the visual node graph.

In various implementations, the user interface 500 may have one or more selectable tabs 530, which in this instance, include selectable tabs labeled "Preview", "History", "Code", "Permissions", "Data Health", and "Build Timeline". Selecting one of the selectable tabs 530 may open an additional information panel providing the relevant information associated with the selected tab. For instance, selecting the "Code" selectable tab may display code associated with a particular node of the visual node graph, such as the code used to generate a resource (e.g., the transformation or functions applied to upstream data to produce a data set) that a selected node represents.

Figure 6A:
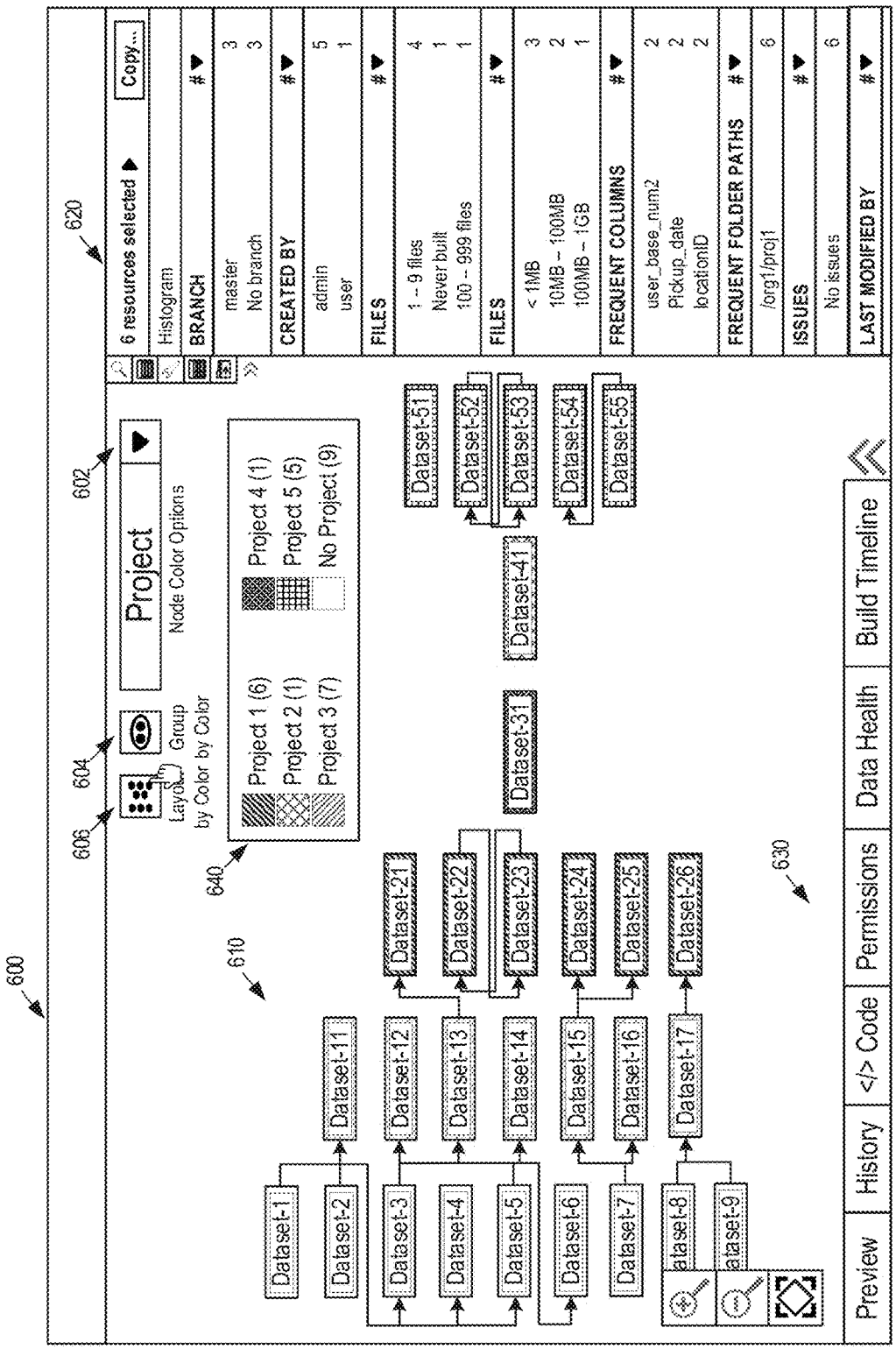
FIGS. 6A-6C illustrate example user interfaces that allow resources represented in a visual node graph to be grouped and displayed based on various schemes, according to various embodiments of the present disclosure.
Figure 6B:
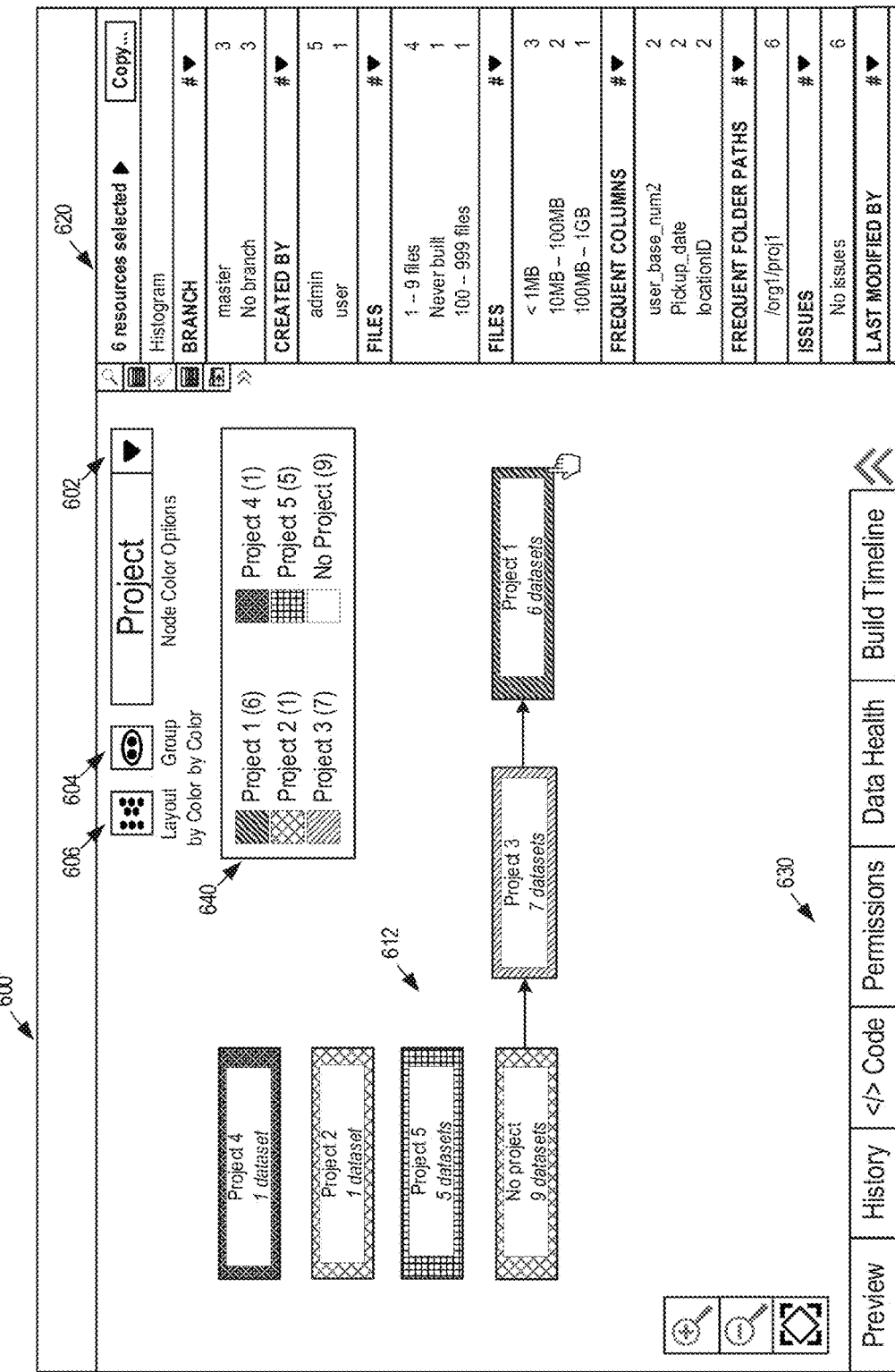
Figure 6C:
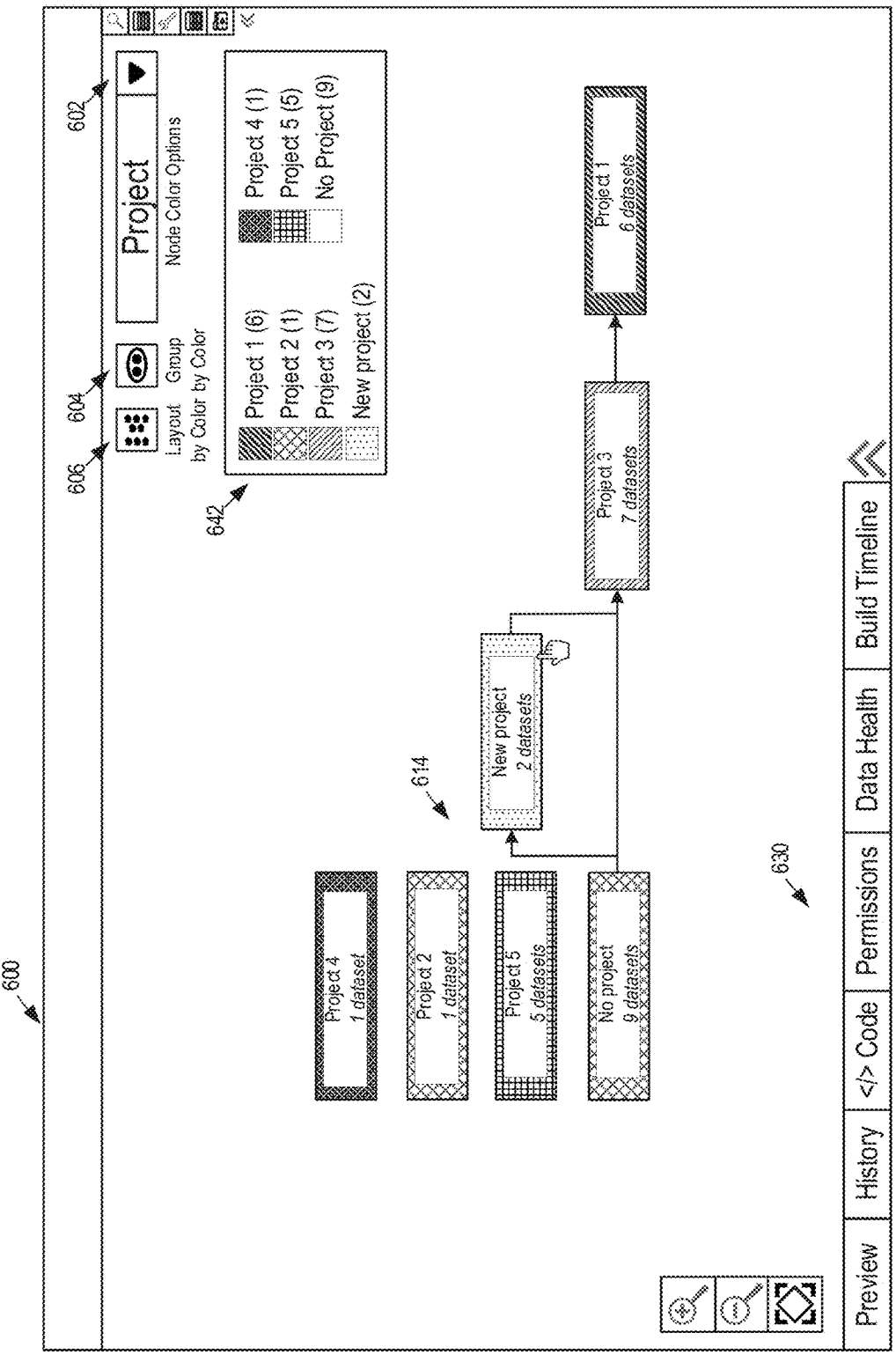

FIGS. 6A-6C also illustrate example user interfaces associated with allowing resources represented in a visual node graph to be grouped and displayed based on various schemes, according to various embodiments of the present disclosure. FIGS. 6A-6C are discussed together.

More specifically, FIGS. 6A-6C illustrate an example user interface 600 (e.g., for a resource dependency system, such as resource dependency system 120) that includes a visual node graph that can be used to display representations of resources (e.g., data sets associated with various stages of a pipeline) and the dependencies between those resources. FIG. 6A shows a visual node graph 610, FIG. 6B shows a visual node graph 612, and FIG. 6C shows a visual node graph 614. Each visual node graph may display representations of resources as nodes and the dependency relationships between those resources as lines, arrows, or edges between the corresponding nodes.

Similarly to user interface 500 in FIGS. 5A and 5B, the user interface 600 may include a drop-down menu 602 (e.g., similar to drop-down menu 502) that enables a user to select among a list of pre-defined grouping schemes to use with a display scheme, a button 604 (e.g., similar to button 504) for grouping and displaying the nodes in the visual node graph based on the selected grouping scheme and display scheme, and a button 606 (e.g., similar to button 506) for visually arranging the layout of nodes within the visual node graph based on the selected grouping scheme and display scheme. In this instance, the display scheme may also be a coloration scheme, such that nodes in the visual node graph are displayed as different colors based on their type (e.g., properties associated with their corresponding resource). Accordingly, the drop-down menu 602 is also labeled "Node Color Options", button 604 is also labeled "Group by Color", and button 606 is also labeled "Layout by Color".

However, unlike in FIGS. 5A and 5B, in this instance, the drop-down menu 602, which enables a user to select among a list of pre-defined grouping schemes to use with a display scheme, indicates a selection of the "Project" option as the grouping scheme for classifying nodes of different types. Selecting the "Project" option may classify (and thus, color based on the display scheme) each node based on the project that the resource represented by the node belongs to. For instance, as shown in the legend 640, the resources represented in the visual node graph 610 of FIG. 6A may belong to "Project 1", "Project 2", "Project 3", "Project 4", "Project 5", or "No Project". The legend 640 may also indicate, for each type, a number in parentheses which corresponds to the number of resources belonging to each of those projects that are depicted in the visual node graph.

The visual node graph 610 of FIG. 6A may be the result of a user selecting button 606, labeled "Layout by Color", to arrange the nodes of the visual node graph 610 based on the selected grouping and display scheme. Since the grouping scheme selected by the drop-down menu 602 in this instance specifies the classification of each node based on the project that the resource represented by the node belongs to, the resulting visual node graph 610 may arrange nodes in clusters of the same type. From the user's perspective, nodes of the same cluster will have the same color and type (e.g., and be associated with resources of the same project). The lines, arrows, or edges between the nodes that illustrate the dependency relationships between the represented resources can be preserved, but may need to be re-pathed to reflect the new arrangement of nodes. Thus, the visual node graph 610 has an arrangement that depicts six distinct clusters of nodes associated with the six different types provided by the selected grouping scheme. This particular configuration for arranging the nodes of the visual node graph 610 may be helpful towards providing a user a rough idea of dependency relationships at a project-level, which can be visualized from the dependency relationships between the resources among the different projects. For instance, it can be seen that the resources of "Project 1" are largely dependent on the resources of "Project 3". The resources of "Project 2" and "Project 4" are self-contained, and the resources of "Project 5" are largely inter-dependent among themselves.

Some of these higher-level dependency relationships can be better visualized by selecting button 604, labeled "Group by Color", for grouping and displaying the nodes in the visual node graph based on the selected grouping scheme and display scheme. Since "Project" is selected as the grouping scheme in the drop-down menu 602, grouping together nodes of the same color will result in nodes associated with resources of the same project being grouped together into a superseding node. For instance, selecting button 604 may result in an updated visual node graph 612 shown in FIG. 6B, which is best understood by comparison to the visual node graph 610 of FIG. 6A. In the visual node graph 612, the nodes corresponding to each of the projects have been grouped together and visually replaced by a single superseding node of the same color that corresponds to that project. The dependency relationships shown between resources of different projects in visual node graph 610 can be inherited, condensed, and displayed between the nodes of the updated visual node graph 612. For instance, the visual node graph 612 shows a node for "Project 4", which includes one dataset; a node for "Project 2", which includes one dataset; a node for "Project 5", which includes five datasets; a node for "No project", which includes nine datasets; a node for "Project 3", which includes seven datasets; and a node for "Project 1", which includes six datasets. The visual node graph 612 shows the nodes for "Project 4", "Project 2", and "Project 5" as self-contained, and it also shows that for the six datasets of "Project 1" there exist dependencies on the seven datasets of "Project 3", which in turn have existing dependencies on nine datasets of "No project". It should be noted that if there had been at least one dataset in "Project 3" that had a dependency on a dataset in "Project 1", then the updated visual node graph 612 would also show an arrow or directed edge from the "Project 1" node to the "Project 3" node.

In various implementations, the user may be able to easily switch or revert between various configurations of the visual node graph. Furthermore, the various configurations of the visual node graph may be continually updated to reflect new developments as they occur, such as the addition of resources and nodes, changes to the resources represented by nodes (e.g., changes to the properties and attributes of those resources), or changes to the dependency relationships between underlying resources. For instance, the user may be able to ungroup the nodes to revert from the visual node graph 612 in FIG. 6B back to the visual node graph 610 in FIG. 6A. Then, if the user added two additional resources for representation by the visual node graph 610 and the user has specified those resources are associated with "New project" (a project previously unrepresented in the grouping scheme of visual node graph 610), the two additional nodes representing those resources could be assigned a different color than the other nodes and selecting the button 604 to group by color would result in the generation of a visual node graph that includes a node for "New project". If the user additionally specified that those two resources have dependencies on resources that were classified as "No project" and are additionally depended upon by one or more resources in "Project 3", then selecting button 604 for grouping the nodes could result in the visual node graph 614 shown in FIG. 6C, which not only shows a node for "New project" to represent the grouping of those two added resources, but also shows that those two added resources have dependencies on resources of "No project" and are depended upon by one or more resources in "Project 3". The updated legend 642 in FIG. 6C additionally reflects the representation of the newly-added "New project" type by the visual node graph 614.

In various implementations, the user interface 600 may have one or more selectable tabs 630, which in this instance, include selectable tabs labeled "Preview", "History", "Code", "Permissions", "Data Health", and "Build Timeline". Selecting one of the selectable tabs 630 may open an additional information panel providing the relevant information associated with the selected tab. For instance, selecting the selectable tab labeled "Code" may display code associated with a particular node of the visual node graph, such as the code used to generate a resource (e.g., the transformation or functions applied to upstream data to produce a data set) that a selected node represents.

In various implementations, the user interface 600 may include an information panel 620 that may provide additional information associated with nodes in the visual node graph, such as a breakdown of the various categories for the properties and attributes among the resources represented by selected nodes (e.g., from a cursor drag user selection) in the visual node graph or, if no nodes are selected, all of the nodes in the visual node graph. The breakdown may indicate the number of resources in the selection for various categories among each of the listed properties or attributes, which can include the user that created the resource, the number of files associated with that resource, the size of those files, the frequent columns among those resources, and so forth as shown in FIGS. 6A and 6B. For example, a user may cursor drag over the six nodes for "Project 1" shown in the visual node graph 610 of FIG. 6A, and the information panel 620 may display a breakdown of the various categories among the properties and attributes of the resources represented by those six nodes (e.g., the files associated with three of those resources are under 1 MB in size).

In various implementations, the breakdown of the various categories of the properties and attributes shown in the information panel 620 may be further used to drill-down or narrow the selection of the nodes in the visual node graph. In other words, selecting a category may highlight the corresponding nodes in the visual node graph that are in that category and multiple categories may be selected at once. For instance, if nodes for six resources are selected and the breakdown indicates that three of them fit a category of having associated files that are under 1 MB in size, selecting that category may highlight or select those nodes in the visual node graph. If two of them fit a category of having associated files between 10 MB-100 MB in size, then selecting both categories may highlight or select all five nodes (e.g., the union of those categories) in the visual node graph. In some implementations, the visual node graph may also be updateable in order to display only the selected nodes. In some implementations, the selection of nodes in the visual node graph may be usable as a selectable grouping scheme (e.g., distinguishing between selected and unselected) for the basis of the various features described herein. These features are further explored and discussed in FIGS. 7A and 7B.

Figure 7A:
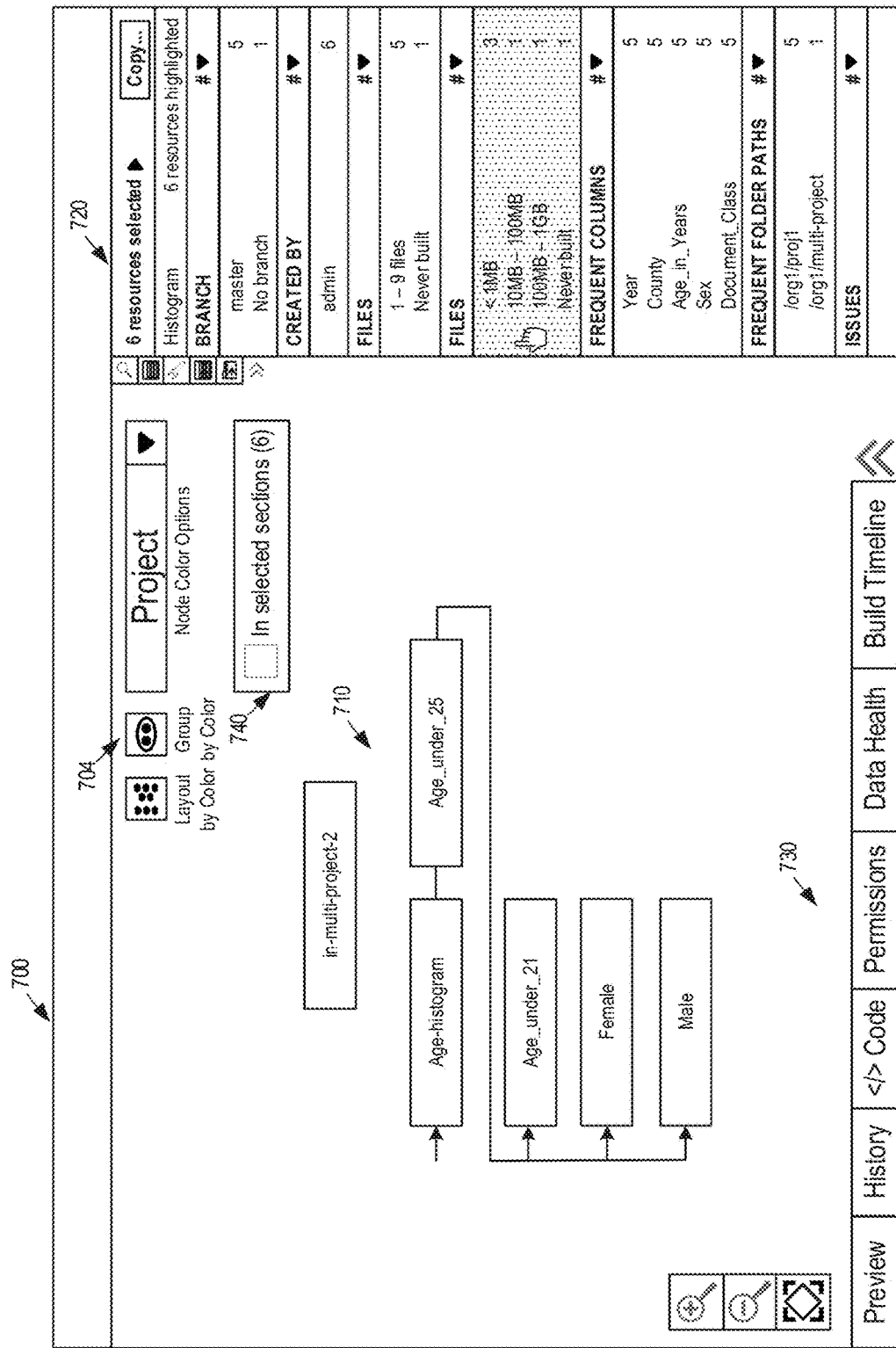
FIGS. 7A and 7B illustrate example user interfaces that allow resources represented in a visual node graph to be grouped and displayed based on various schemes, according to various embodiments of the present disclosure.
Figure 7B:
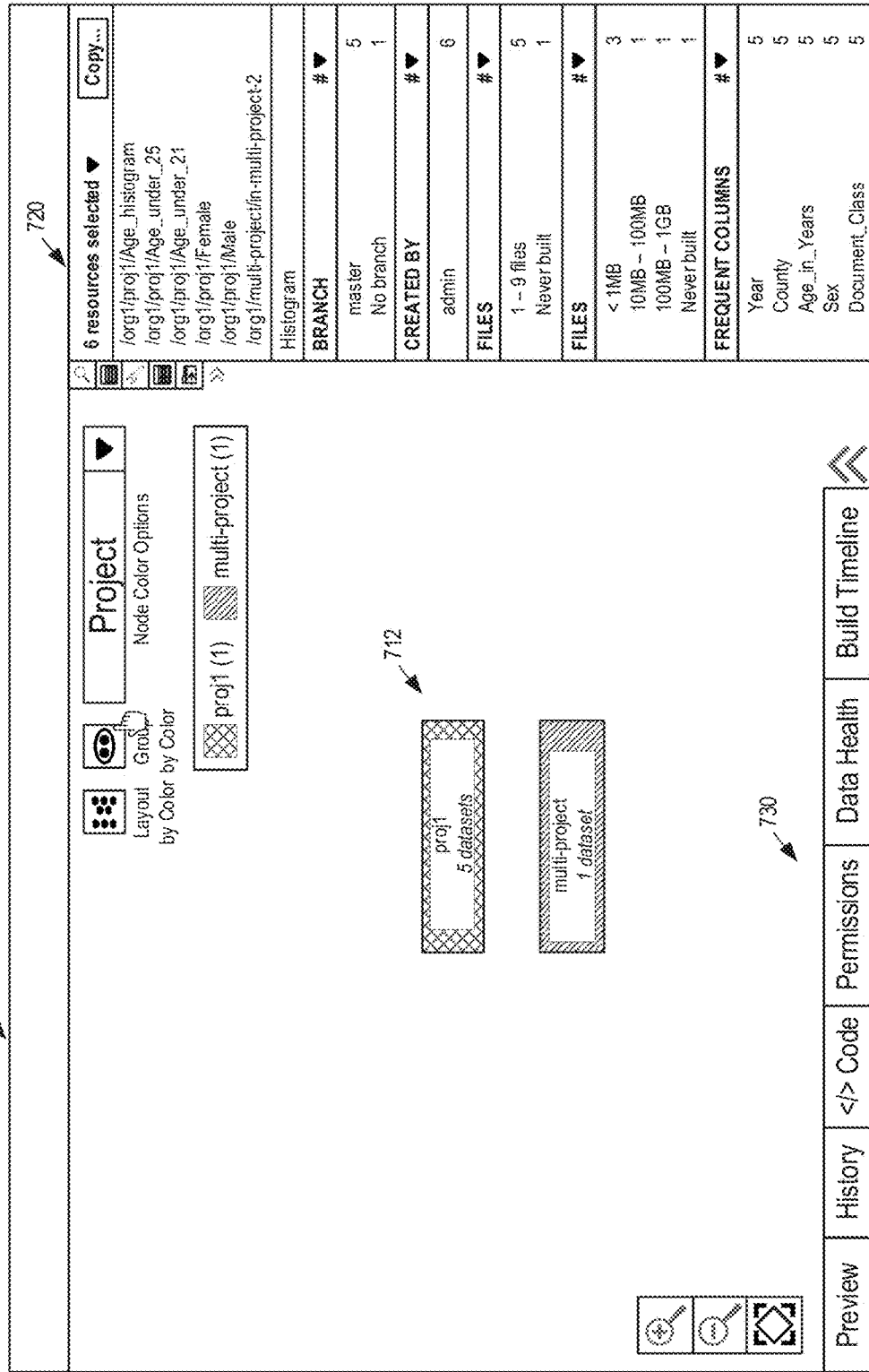

FIGS. 7A and 7B also illustrate example user interfaces associated with displaying resource dependencies, according to various embodiments of the present disclosure. More specifically, FIGS. 7A and 7B illustrate example user interfaces that allow resources represented in a visual node graph to be grouped and displayed based on various schemes. FIGS. 7A and 7B are discussed together.

FIG. 7A illustrates an example user interface 700 (e.g., for a resource dependency system, such as resource dependency system 120) that includes a visual node graph that can be used to display representations of resources (e.g., data sets associated with various stages of a pipeline) and the dependencies between those resources. FIG. 7A shows a visual node graph 710 and FIG. 7B shows a visual node graph 712. Each visual node graph may display representations of resources as nodes and the dependency relationships between those resources as lines, arrows, or edges between the corresponding nodes.

The visual node graph 710 of FIG. 7A may be the result of a user making a selection of six nodes in a visual node graph and updating the visual node graph to display only the selected nodes. Accordingly, the legend 740 indicates that all six of the nodes are of "In selected sections". In this example, the five nodes shown with dependency relationships ("Age-histogram", "Age_under_25", "Age_under 21", "Female", and "Male") may represent resources associated with one project (e.g., "proj1"), and the "in-multi-project-2" node may represent a resource associated with another project (e.g., "multi-project"). The information panel 720 may provide additional information associated with the selected nodes, such as a breakdown of the number of resources that fit into the various categories for the properties and attributes associated with the resources represented by selected nodes. This can include properties and attributes such as the detailed folder path of the resources, frequent folder paths containing the resources, the user that created the resources, the number of files associated with the resources, the size of those files, the frequent columns among those resources, and so forth as shown in FIGS. 7A and 7B.

The user interface 700 may include a button 704 (similar to buttons 604 and 504), labeled "Group by Color", which may group and display the nodes in the visual node graph 710 based on the selected grouping scheme and display scheme. In this instance, "Project" is selected as the grouping scheme (not selected/unselected nodes), so nodes associated with resources of the same project will be grouped together into a superseding node instead of grouping all six selected nodes under one node. Thus, selecting button 704 may result in the updated visual node graph 712 shown in FIG. 7B, which represents the five resources associated with "proj1" as a superseding node of a first color and the resource associated with "multi-project" as a superseding node of a second color.

For instance, selecting button 604 may result in an updated visual node graph 612 shown in FIG. 6B, which is best understood by comparison to the visual node graph 610 of FIG. 6A. In the visual node graph 612, the nodes corresponding to each of the projects have been grouped together and visually replaced by a single superseding node of the same color that corresponds to that project. The dependency relationships shown between resources of different projects in visual node graph 610 can be inherited, condensed, and displayed between the nodes of the updated visual node graph 612.

In various implementations, the user interface 700 may have one or more selectable tabs 730, which in this instance, include selectable tabs labeled "Preview", "History", "Code", "Permissions", "Data Health", and "Build Timeline". Selecting one of the selectable tabs 730 may open an additional information panel providing the relevant information associated with the selected tab. For instance, selecting the selectable tab labeled "Code" may display code associated with a particular node of the visual node graph, such as the code used to generate a resource (e.g., the transformation or functions applied to upstream data to produce a data set) that a selected node represents.

Figure 8:
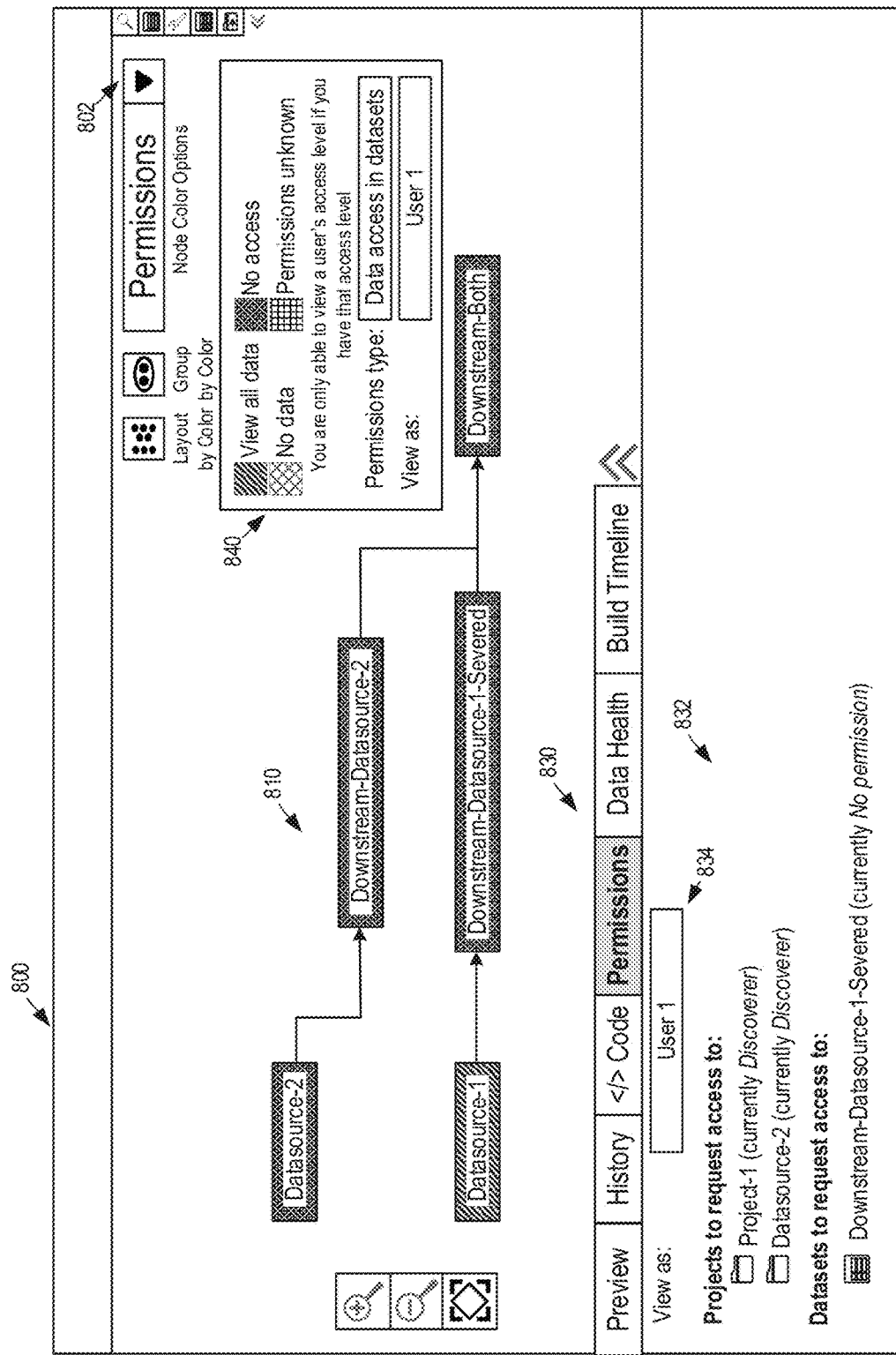
FIG. 8 illustrates an example user interface associated with displaying resource dependencies, such as permissions, associated with resources represented in a visual node graph, according to various embodiments of the present disclosure

FIG. 8 also illustrates an example user interfaces associated with displaying resource dependencies, according to various embodiments of the present disclosure. More specifically, FIG. 8 illustrates an example user interfaces that allow permissions associated with resources represented in a visual node graph to be displayed based on various schemes.

FIG. 8 illustrates an example user interface 800 (e.g., for a resource dependency system, such as resource dependency system 120) that includes a visual node graph that can be used to display representations of resources (e.g., data sets associated with various stages of a pipeline) and the dependencies between those resources. More specifically, FIG. 8 shows a visual node graph 810 that displays representations of resources as nodes and the dependency relationships between those resources as lines, arrows, or edges between the corresponding nodes. It should be noted that the visual node graph 810 of FIG. 8 is very similar to the visual node graph 510 of FIG. 5A, in terms of the resources being represented by the nodes.

However, the "Permissions" grouping scheme has been selected in the drop-down menu 802 labeled "Node Color Options", which directs the classification of nodes and their display (e.g., their coloring based on the display scheme). In this example, the "Permissions" option may classify and color each node in the visual node graph 810 based on the level of permissions granted to a particular user for the resource represented by that node. The user whose perspective serves as the basis for the visual node graph 810 may be selectable. For instance, the legend 840 provides the expected details on the grouping and display schemes for the nodes, but it also includes a selectable field for selecting the user (e.g., "View as: User 1") whose perspective serves as the basis of the visual node graph 810 and a selectable field for selecting the type of permissions (e.g., "Permissions type: Data access in datasets") for which the visual node graph 810 will indicate permissions levels. In some implementations, there may be multiple types of permissions associated with a user for a particular resource. "Data access in datasets" may refer to a type of permissions associated with the actual data contained in a data set and whether a user can view those rows of data. Another kind of permissions may be "resource access", which allows a user to discover and see the existence of a resource or data set but not view the data contained inside it.

Thus, in this instance, legend 840 indicates the display scheme (e.g., colors) of the nodes in the visual node graph 810 are configured for displaying the permissions levels granted to User 1 for accessing the actual data in the various data sets represented by the nodes. The different permissions levels include "No access", "Permissions unknown", "No data" (e.g., no data in the data set), and "View all data". In this specific example, by interpreting the visual node graph 810 against the legend 840, it can be seen that User 1 can view all the data in the data sets associated with "Datasource-1" but has no access to the data in the data sets of "Datasource-2", "Downstream-Datasource-2", "Downstream-Datasource-1-Severed", or "Downstream-Both". Changing the selectable field to select a different user whose perspective serves as the basis of the visual node graph 810 may result in the colors of the nodes in the visual node graph 810 to be updated to reflect the permissions levels granted to that user. Thus, the visual node graph 810 may provide the ability to see permissions for resources from the perspective of different users other than yourself. In some implementations, a user may only be able to view a different user's access level for a resource if the user himself has that access level (to prevent revealing information about the permissions model), otherwise the node for that resource may be classified as "Permissions unknown".

In various implementations, the user interface 800 may have one or more selectable tabs 830, which in this instance, include selectable tabs labeled "Preview", "History", "Code", "Permissions", "Data Health", and "Build Timeline". Selecting one of the selectable tabs 830 may open an additional information panel providing the relevant information associated with the selected tab. In this specific instance, the "Permissions" tab has been selected, which opens up an information panel 832 with a selectable field 834 for selecting a user, for whom the information panel 832 will provide details on the upstream resources that the selected user must be granted access to in order for a user to be able to access a particular resource represented in the visual node graph 810. For instance, the information panel 832 may indicate that, in order to have access to the "Downstream-Both" data sets, the selected user may need to be granted access to upstream data sets from which those data sets depend on. More specifically, the selected User 1 would have to request access to the "Downstream-Datasource-1-Severed" data sets and the "Project-1" and "Datasource-2" projects in order to access the "Downstream-Both" data sets, based on the current access levels granted to the User 1. Thus, the user interface 800 and the resource dependency system may grant the ability to view the upstream resources (e.g., projects and data sets) that a particular user would need to request access to in order to obtain access to a selected resource.

In some implementations, the user interface 800 may additionally provide options for directly requesting access for the selected user. For instance, the names of the projects or data sets in the information panel 832 may be links (e.g., hyperlinks) to request access to that project or data set on the selected user's behalf or may open user interface elements providing further steps in obtaining access to that project or data set.

In the example shown in FIG. 8, the user interface 800 indicates that the user has to obtain access to upstream data sets and projects in order to obtain access to a desired resource. This is because individual users may have permissions that may be transitive (permission transitivity), similar to the way that access control policies and general access levels for column sets and data sets may be transitive as a result of provenance tracking. The revocation or granting of permissions may be transitive and apply to an arbitrary number of levels in the provenance tracking. For instance, if a third data set depends on a first and a second data set, then a user that has permissions revoked from accessing the second data set may also have permissions transitively revoked to access the third data set. Furthermore, the user may also have any permissions transitively revoked for accessing any data sets that depend directly or indirectly on the third data set.

Figure 9:
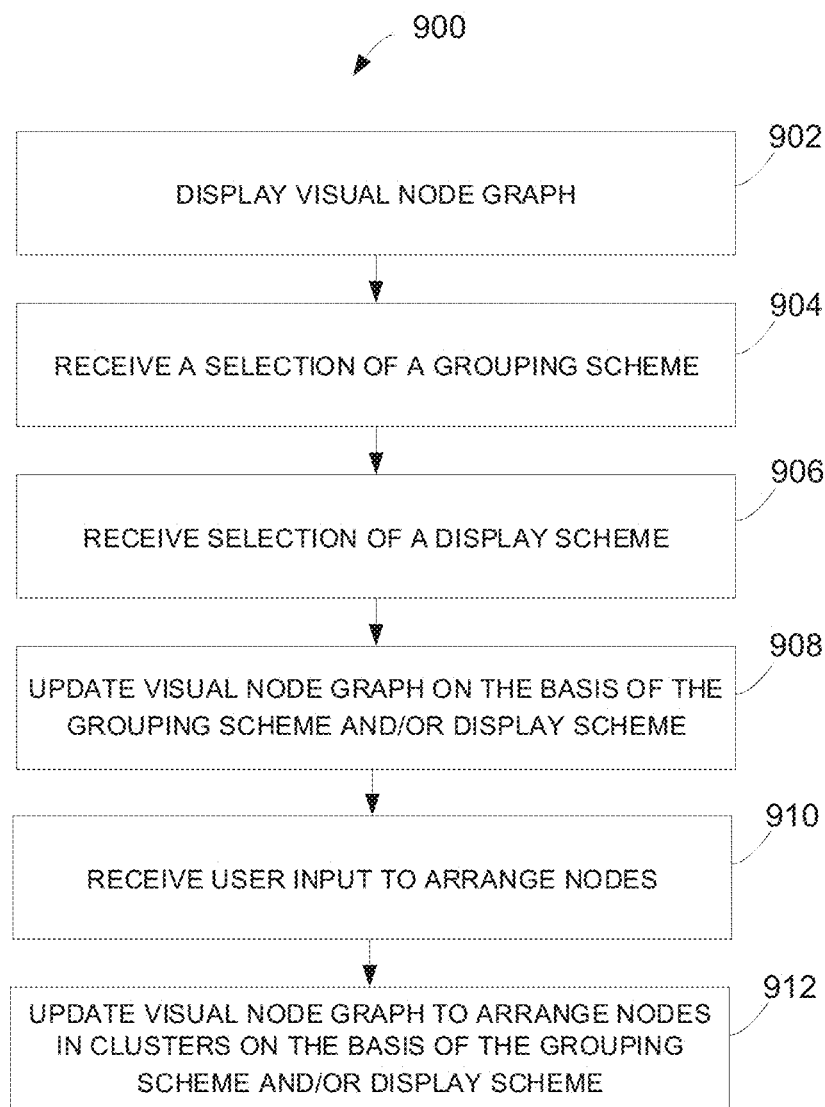
FIG. 9 is a flow chart that illustrates functionality of the resource dependency system for arranging nodes in a visual node graph based on various schemes, according to various embodiments of the present disclosure.

FIG. 9 illustrate a flow chart diagram 900 illustrating functionality of the resource dependency system for arranging nodes in a visual node graph based on various schemes, according to various embodiments of the present disclosure.

At block 902, the resource dependency system may display a visual node graph as described herein. For instance, the visual node graph may have a plurality of nodes representing resources, and one or more directed edges with each directed edge between two nodes. The directed edge may convey or indicate a directional dependency between the pair of nodes as well as between the resources represented by the pair of nodes.

At block 904, the resource dependency system may optionally receive a selection of a grouping scheme for classifying nodes of a visual node graph into different types of nodes on the basis of the properties or attributes of the resources those nodes represent. There may be various pre-defined grouping schemes available from which a user can make a selection, or a user may be able to define their own grouping scheme to use. Some examples of grouping schemes that have been presented herein include grouping schemes for classifying nodes based on a user-selection of nodes (e.g., selected/unselected nodes, thereby allowing a display scheme to applied to a highlighted subset of nodes), the project that the represented resource is from or associated with, the resource type of the represented resource, the permissions or access level granted to a particular user for the represented resource, parameters or categories of parameters associated with resources (e.g., node-represented resources having a file size or number of files within certain ranges, which can be selected using filters applied to the visual node graph through the user interface), and so forth. The grouping scheme may be selectable in a user interface, such as via the drop-down menu 602 shown in FIGS. 6A-6C.

At block 906, the resource dependency system may optionally receive a selection of a display scheme for instructing the differential display of different types of nodes (classified based on the grouping scheme) in the visual node graph. For instance, the display scheme may specify that nodes of a first type are to be represented by a particular icon or shape, or have a certain shading or coloring, nodes of a second type are to be represented by a particular icon or shape, or have a certain shading or coloring, and so forth. Display schemes may define variations among nodes based on a singular dimension, such as shape (e.g., a shape scheme), coloration (e.g., a coloration scheme), shading (e.g., a shading scheme), and so forth. The display scheme may be selectable in a user interface and there may be various pre-defined display schemes available from which a user can make a selection, or a user may be able to define their own display scheme to use. In the examples shown in FIGS. 5A-5B, 6A-6C, 7A, and 7B, the display scheme is a coloration scheme that specifies different colors for the different types of nodes (e.g., a first set of nodes of a first type are given a first color, a second set of nodes of a second type are given a second color, and so forth).

At block 908, the resource dependency system may update the visual node graph on the basis of the grouping scheme and/or display scheme, such that nodes of different types in the visual node graph are displayed differently based on the display scheme. In some instances, the grouping and/or display scheme may have been specified in advance prior to generating the visual node graph, so the resource dependency system would be displaying the visual node graph at this block instead of updating a pre-existing one.

At block 910, the resource dependency system may receive a user input to visually arrange the nodes in the visual node graph. In particular, the user input may be to arrange the nodes in the visual node graph based on the grouping scheme, display scheme, and/or a combination of the two. It should be noted that the example user interfaces described herein illustrate an option for arranging nodes based on their color, but it can be understood that refers to the result from the user's perspective. In actuality, the nodes are first classified into types based on a grouping scheme and then given a color on the basis of that type, such that nodes of the same type should have the same color. Once this has occurred, visually arranging the nodes into groups based on their color (set by the display scheme), their type (set by the grouping scheme), or a combination of the two, should have the same practical result from the user's perspective.

At block 912, the resource dependency system may visually arrange the nodes in the visual node graph into clusters on the basis of the grouping scheme and/or display scheme. For instance, in the example user interfaces described herein, the option is presented to a user for arranging nodes of the visual node graph into clusters based on their color because that is the end result from the user's perspective. The resource dependency system could produce that result by visually arranging the nodes based on their assigned color (set by the display scheme), their type (set by the grouping scheme), or a combination of the two. Thus, as a general matter, the resource dependency system could be arranging the nodes of the visual node graph into clusters on the basis of the grouping scheme, the display scheme, or a combination of the two.

Figure 10:
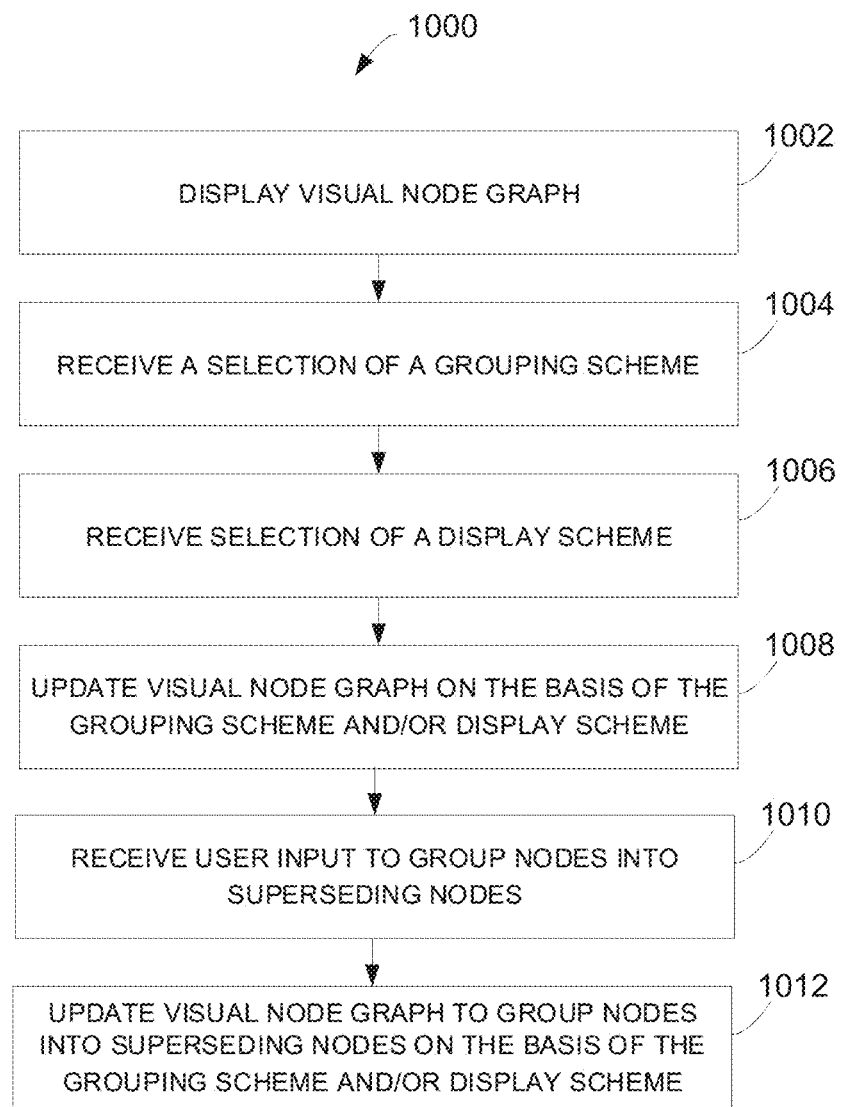
FIG. 10 is a flow chart that illustrates functionality of the resource dependency system for grouping nodes in a visual node graph into superseding nodes based on various schemes, according to various embodiments of the present disclosure.

FIG. 10 illustrate a flow chart diagram 1000 illustrating functionality of the resource dependency system for grouping nodes in a visual node graph into superseding nodes based on various schemes, according to various embodiments of the present disclosure.

At block 1002, the resource dependency system may display a visual node graph as described herein. For instance, the visual node graph may have a plurality of nodes representing resources, and one or more directed edges with each directed edge between two nodes. The directed edge may convey or indicate a directional dependency between the pair of nodes as well as between the resources represented by the pair of nodes.

At block 1004, the resource dependency system may optionally receive a selection of a grouping scheme for classifying nodes of a visual node graph into different types of nodes on the basis of the properties or attributes of the resources those nodes represent. There may be various pre-defined grouping schemes available from which a user can make a selection, or a user may be able to define their own grouping scheme to use. Some examples of grouping schemes that have been presented herein include grouping schemes for classifying nodes based on a user-selection of nodes (e.g., selected/unselected nodes, thereby allowing a display scheme to applied to a highlighted subset of nodes), the project that the represented resource is from or associated with, the resource type of the represented resource, the permissions or access level granted to a particular user for the represented resource, parameters or categories of parameters associated with resources (e.g., node-represented resources having a file size or number of files within certain ranges, which can be selected using filters applied to the visual node graph through the user interface), and so forth.

The grouping scheme may be selectable in a user interface, such as via the drop-down menu 602 shown in FIGS. 6A-6C.

At block 1006, the resource dependency system may optionally receive a selection of a display scheme for instructing the differential display of different types of nodes (classified based on the grouping scheme) in the visual node graph. For instance, the display scheme may specify that nodes of a first type are to be represented by a particular icon or shape, or have a certain shading or coloring, nodes of a second type are to be represented by a particular icon or shape, or have a certain shading or coloring, and so forth. Display schemes may define variations among nodes based on a singular dimension, such as shape (e.g., a shape scheme), coloration (e.g., a coloration scheme), shading (e.g., a shading scheme), and so forth. The display scheme may be selectable in a user interface and there may be various pre-defined display schemes available from which a user can make a selection, or a user may be able to define their own display scheme to use. In the examples shown in FIGS. 5A-5B, 6A-6C, 7A, and 7B, the display scheme is a coloration scheme that specifies different colors for the different types of nodes (e.g., a first set of nodes of a first type are given a first color, a second set of nodes of a second type are given a second color, and so forth).

At block 1008, the resource dependency system may update the visual node graph on the basis of the grouping scheme and/or display scheme, such that nodes of different types in the visual node graph are displayed differently based on the display scheme. In some instances, the grouping and/or display scheme may have been specified in advance prior to generating the visual node graph, so the resource dependency system would be displaying the visual node graph at this block instead of updating a pre-existing one.

At block 1010, the resource dependency system may receive a user input to visually group the nodes in the visual node graph into grouped nodes (e.g., superseding nodes). In particular, the user input may be directed to group the nodes in the visual node graph into grouped nodes based on the grouping scheme, display scheme, and/or a combination of the two. It should be noted that the example user interfaces described herein illustrate an option for grouping nodes into grouped nodes based on their color, but it can be understood that refers to the result from the user's perspective. In actuality, the nodes are first classified into types based on a grouping scheme and then given a color on the basis of that type, such that nodes of the same type should have the same color. Once this has occurred, grouping the nodes into superseding nodes based on their color (set by the display scheme), their type (set by the grouping scheme), or a combination of the two, should have the same practical result from the user's perspective.

At block 1012, the resource dependency system may update the visual node graph to group nodes in the visual node graph into grouped nodes (e.g., superseding nodes) on the basis of the grouping scheme and/or display scheme. For instance, in the example user interfaces described herein, the option is presented to a user for grouping nodes into superseding nodes based on their color because that is the end result from the user's perspective. The resource dependency system could produce that result by organizing the nodes into groups based on their assigned color (set by the display scheme), their type (set by the grouping scheme), or a combination of the two. Thus, as a general matter, the resource dependency system could be grouping the nodes of the visual node graph into superseding nodes on the basis of the grouping scheme, the display scheme, or a combination of the two. All the nodes of the same type and/or can be rolled-up into a superseding node. In some implementations, only some of the nodes in the visual node graph may be grouped into a superseding node. For instance, only some types of nodes may be grouped, a user selection of nodes may be grouped, and so forth.

A resulting superseding node may inherit the color of its constituent nodes that it replaces. The superseding nodes can inherit the edges and dependency relationships of its constituent nodes, or more practically, a superseding node may inherit for visual display any edges associated with its constituent nodes that are not between two constituent nodes. Inherited edges can also be condensed as appropriate. For instance, if a subset of a second set of nodes of a second color are directly dependent on a first set of nodes of a first color (and not the other way around), a first grouped node of the first color replacing the first set of nodes may be drawn with directed edges from the first grouped node to the subset of the second set of nodes. If the second set of nodes of the second color are also grouped, resulting in a second grouped node of the second color, then edges between the first set of nodes and the second set of nodes can be condensed into a singular edge from the first grouped node to the second grouped node.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
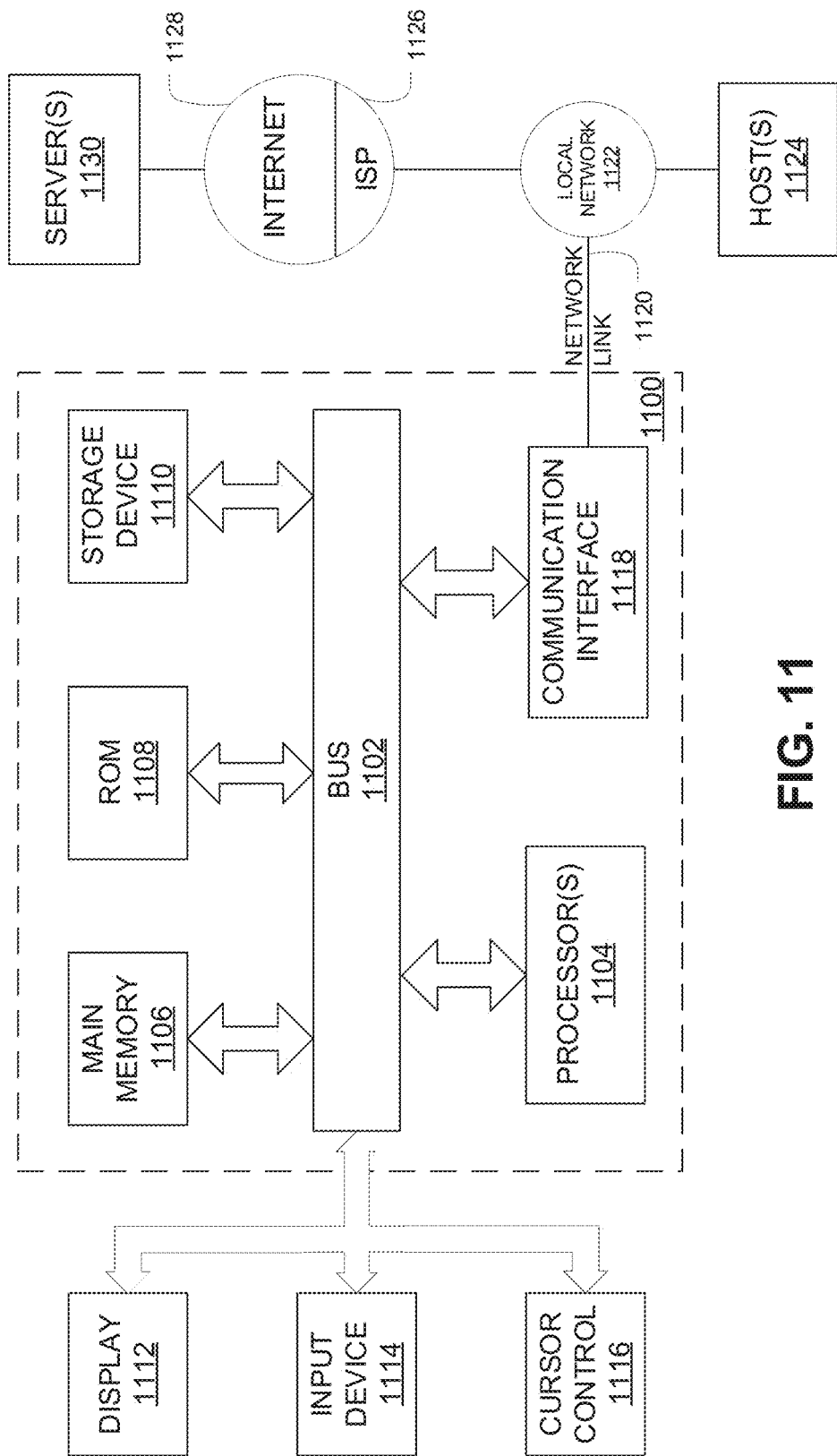
FIG. 11 is a block diagram that illustrates a computer system upon which various embodiments may be implemented.

For example, FIG. 11 is a block diagram that illustrates a computer system 1100 upon which various embodiments may be implemented. Computer system 1100 includes a bus 1102 or other communication mechanism for communicating information, and a hardware processor, or multiple processors, 1104 coupled with bus 1102 for processing information. Hardware processor(s) 1104 may be, for example, one or more general purpose microprocessors.

Computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

Computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1100 may include a user interface module to implement a GUI that may be stored in a mass storage device as computer executable program instructions that are executed by the computing device(s). Computer system 1100 may further, as described below, implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more computer readable program instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method of processing and managing data set column lineage, comprising:
   by one or more processors executing program instructions:
   generating user interface data useable for rendering a first portion of a graphical user interface comprising representations of one or more columns corresponding to one or more datasets;
   receiving via the first portion of the graphical user interface a user selection of a representation of a selected column from among the representations of the one or more columns;
   in response to the user selection, determining one or more first target columns from one or more first target datasets based on accessing column metadata associated with the one or more first target columns, wherein the one or more first target columns are dependent on the selected column according to a data dependency of a column lineage, the data dependency being associated with a data transformation applied to the selected column, wherein the column metadata of the one or more first target columns indicates the data transformation was applied to the selected column to transform the selected column into the one or more first target columns, wherein the column metadata includes an indication of transformation code defining a set of instructions to apply the data transformation to the selected column, wherein the transformation code is versioned and stored in data storage, wherein a version of the transformation code references a version of the selected column to which the data transformation is applied to link the version of the transformation code with the version of the selected column; and updating the first portion of the graphical user interface to further comprise:

representations of the one or more first target datasets;

representations of the one or more first target columns shown in relation to associated first target datasets of the one or more first target datasets, wherein each representation of the one or more first target columns is different from each representation of the one or more first target datasets;

an arrow or edge from the representation of the selected column to the representations of the one or more first target columns, the arrow or edge indicating the data dependency associated with the data transformation applied to the selected column; and the transformation code comprising software code in one or more programming languages, the transformation code being retrieved based on the indication included in the column metadata.

2. The computer-implemented method of claim 1, further comprising:

determining one or more second target columns from one or more second target datasets, wherein the one or more second target columns are indirectly dependent on the selected column, wherein the first portion of the graphical user interface further comprises:

representations of target datasets of the one or more second target datasets, wherein the representations of the target datasets of the one or more second target datasets appear on a first side of the selected column;

representations of target columns of the one or more second target columns shown in relation to associated second target datasets; and for each representation of a target column of the one or more second target columns, an arrow or edge from the respective representation of the target column to a representation of a column from which the respective target column directly depends.

3. The computer-implemented method of claim 1, wherein the representations of the target datasets of the one or more first target datasets appear on a first side of the selected column.

4. The computer-implemented method of claim 3, further comprising:

determining one or more first source columns from one or more first source datasets, wherein the selected column is dependent on the one or more first source columns, wherein the first portion of the graphical user interface further comprises:

representations of source datasets of the one or more first source datasets, wherein the representations of source datasets of the one or more first source datasets appear on a second side of the selected column;

representations of source columns of the one or more first source columns, wherein each representation of a source column appears within a corresponding representation of a source dataset of the one or more first source datasets that the respective source column is from; and an arrow or edge from the representations of the source columns of the one or more first source columns to the representation of the selected column.

5. The computer-implemented method of claim 4, further comprising:

determining one or more second source columns from one or more second source datasets, wherein the selected column is indirectly dependent on the one or more second source columns, wherein the first portion of the graphical user interface further comprises:

representations of source datasets of the one or more second source datasets, wherein the representations of the source datasets of the one or more second source datasets appear on the second side of the selected column;

representations of source columns of the one or more second source columns, wherein each representation of each source column of the one or more second source columns appears within a corresponding representation of a source dataset that the respective source column is from; and for each representation of a source column of the one or more second source columns, an arrow or edge from the respective representation of the source column to a representation of a column that is directly dependent on the respective source column.

6. The computer-implemented method of claim 4, wherein determining the one or more first source columns involves accessing column metadata associated with the selected column.

7. A computing system configured for processing and managing data set column lineage, comprising:

a computer readable storage medium having program instructions embodied therewith; and one or more processors configured to execute the program instructions to cause the computing system to:

generate user interface data useable for rendering a first portion of a graphical user interface comprising representations of one or more columns corresponding to one or more datasets;

receive via the first portion of the graphical user interface a user selection of a representation of a selected column from among the representations of the one or more columns;

in response to the user selection, determine one or more first target columns from one or more first target datasets based on accessing column metadata associated with the one or more first target columns, wherein the one or more first target columns are dependent on the selected column according to a data dependency of a column lineage, the data dependency being associated with a data transformation applied to the selected column, wherein the column metadata of the one or more first target columns indicates the data transformation was applied to the selected column to transform the selected column into the one or more first target columns, wherein the column metadata includes an indication of transformation code defining a set of instructions to apply the data transformation to the selected column, wherein the transformation code is versioned and stored in data storage, wherein a version of the transformation code references a version of the selected column to which the data transformation is applied to link the version of the transformation code with the version of the selected column; and update the first portion of the graphical user interface to further comprise:
representations of the one or more first target datasets;
representations of the one or more first target columns shown in relation to associated first target datasets of the one or more first target datasets, wherein each representation of the one or more first target columns is different from each representation of the one or more first target datasets;
an arrow or edge from the representation of the selected column to the representations of the one or more first target columns, the arrow or edge indicating the data dependency associated with the data transformation applied to the selected column; and
the transformation code comprising software code in one or more programming languages, the transformation code being retrieved based on the indication included in the column metadata.

8. The computing system of claim 7, wherein the one or more processors are further configured to execute the program instructions to cause the computing system to:
determine one or more second target columns from one or more second target datasets, wherein the one or more second target columns are indirectly dependent on the selected column,
wherein the first portion of the graphical user interface further comprises:
representations of target datasets of the one or more second target datasets, wherein the representations of the target datasets of the one or more second target datasets appear on a first side of the selected column;
representations of target columns of the one or more second target columns shown in relation to associated second target datasets; and
for each representation of a target column of the one or more second target columns, an arrow or edge from the respective representation of the target column to a representation of a column from which the respective target column directly depends.

9. Non-transitory computer-readable media including computer-executable instructions that, when executed by a computing system, cause the computing system to perform operations comprising:
generating user interface data useable for rendering a first portion of a graphical user interface comprising representations of one or more columns corresponding to one or more datasets;
receiving via the first portion of the graphical user interface a user selection of a representation of a selected column from among the representations of the one or more columns;
in response to the user selection, determining one or more first target columns from one or more first target datasets based on accessing column metadata associated with the one or more first target columns, wherein the one or more first target columns are dependent on the selected column according to a data dependency of a column lineage, the data dependency being associated with a data transformation applied to the selected column, wherein the column metadata of the one or more first target columns indicates the data transformation was applied to the selected column to transform the selected column into the one or more first target columns, wherein the column metadata includes an indication of transformation code defining a set of instructions to apply the data transformation to the selected column, wherein the transformation code is versioned and stored in data storage, wherein a version of the transformation code references a version of the selected column to which the data transformation is applied to link the version of the transformation code with the version of the selected column; and updating the first portion of the graphical user interface to further comprise:
representations of the one or more first target datasets;
representations of the one or more first target columns shown in relation to associated first target datasets of the one or more first target datasets, wherein each representation of the one or more first target columns is different from each representation of the one or more first target datasets;
an arrow or edge from the representation of the selected column to the representations of the one or more first target columns, the arrow or edge indicating the data dependency associated with the data transformation applied to the selected column; and
the transformation code comprising software code in one or more programming languages, the transformation code being retrieved based on the indication included in the column metadata.

10. The non-transitory computer-readable media of claim 9, wherein the computer-executable instructions, when executed by a computing system, further cause the computing system to perform operations comprising:
determining one or more second target columns from one or more second target datasets, wherein the one or more second target columns are indirectly dependent on the selected column,
wherein the first portion of the graphical user interface further comprises:
representations of target datasets of the one or more second target datasets, wherein the representations of the target datasets of the one or more second target datasets appear on a first side of the selected column;
representations of target columns of the one or more second target columns shown in relation to associated second target datasets; and
for each representation of a target column of the one or more second target columns, an arrow or edge from the respective representation of the target column to a representation of a column from which the respective target column directly depends.

11. The computer-implemented method of claim 1, wherein the transformation code comprises a cumulative transformation code corresponding to collective transformations applied to a plurality of source columns throughout earlier stages of a data pipeline to generate the selected column.

12. The computing system of claim 7, wherein the transformation code comprises a cumulative transformation code corresponding to collective transformations applied to a plurality of source columns throughout earlier stages of a data pipeline to generate the selected column.

13. The non-transitory computer-readable media of claim 9, wherein the transformation code comprises a cumulative transformation code corresponding to collective transformations applied to a plurality of source columns throughout earlier stages of a data pipeline to generate the selected column.

14. The computer-implemented method of claim 1, further comprising modifying the column metadata based on user input via the first portion of the graphical user interface.

15. The computing system of claim 7, wherein the one or more processors are further configured to modify the column metadata based on user input via the first portion of the graphical user interface.

16. The computing system of claim 7, wherein the representations of the target datasets of the one or more first target datasets appear on a first side of the selected column within the first portion of the graphical user interface.

17. The computing system of claim 7, wherein the one or more processors are further configured to:
determine one or more first source columns from one or more first source datasets, wherein the selected column is dependent on the one or more first source columns, wherein the first portion of the graphical user interface further comprises:
representations of source datasets of the one or more first source datasets, wherein the representations of source datasets of the one or more first source datasets appear on a second side of the selected column;
representations of source columns of the one or more first source columns, wherein each representation of a source column appears within a corresponding representation of a source dataset of the one or more first source datasets that the respective source column is from; and
an arrow or edge from the representations of the source columns of the one or more first source columns to the representation of the selected column.

18. The non-transitory computer-readable media of claim 9, wherein the computer-executable instructions, when executed by a computing system, further cause the computing system to perform operations comprising modifying the column metadata based on user input via the first portion of the graphical user interface.

19. The computer-implemented method of claim 1 further comprising, by the one or more processors executing the program instructions: updating the data dependency associated with the data transformation applied to the selected column responsive to a user selection via the graphical user interface to move the arrow or edge from the representation of the selected column to the representations of the one or more first target columns.

* * * * *